(12) United States Patent
Montojo et al.

(10) Patent No.: US 8,693,429 B2
(45) Date of Patent: Apr. 8, 2014

(54) METHODS AND APPARATUS FOR GENERATION AND USE OF REFERENCE SIGNALS IN A COMMUNICATIONS SYSTEM

(75) Inventors: Juan Montojo, San Diego, CA (US); Amir Farajidana, Sunnyvale, CA (US); Alexei Y. Gorokhov, San Diego, CA (US); Kapil Bhattad, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 12/750,556

(22) Filed: Mar. 30, 2010

(65) Prior Publication Data

US 2010/0246527 A1    Sep. 30, 2010

Related U.S. Application Data

(60) Provisional application No. 61/165,456, filed on Mar. 31, 2009.

(51) Int. Cl.
   *H04W 4/00* (2009.01)

(52) U.S. Cl.
   USPC ............ 370/330; 370/334; 370/328; 370/338

(58) Field of Classification Search
   USPC .......... 370/260, 338, 328, 334, 484, 491, 504
   See application file for complete search history.

(56) References Cited

U.S. PATENT DOCUMENTS

| | | | |
|---|---|---|---|
| 7,359,738 B2 | 4/2008 | Daniels et al. | |
| 7,474,641 B2 * | 1/2009 | Kuroda | 370/329 |
| 7,733,828 B2 * | 6/2010 | Qu et al. | 370/330 |
| 8,311,001 B2 * | 11/2012 | Kimura et al. | 370/329 |
| 8,463,210 B2 * | 6/2013 | Lee et al. | 455/129 |
| 2004/0246998 A1 * | 12/2004 | Ma et al. | 370/527 |
| 2006/0209670 A1 * | 9/2006 | Gorokhov et al. | 370/208 |
| 2008/0049668 A1 * | 2/2008 | Kakura et al. | 370/329 |
| 2008/0212702 A1 | 9/2008 | Pan et al. | |
| 2010/0014481 A1 | 1/2010 | Ko et al. | |
| 2010/0322100 A1 * | 12/2010 | Wan et al. | 370/252 |

FOREIGN PATENT DOCUMENTS

| | | |
|---|---|---|
| RU | 2289210 C2 | 12/2006 |
| WO | 2004114564 A1 | 12/2004 |
| WO | 2008003227 A1 | 1/2008 |
| WO | 2008072899 A2 | 6/2008 |

(Continued)

OTHER PUBLICATIONS

Alcatel-Lucent et al: "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; Apr. 3, 2007, XP050105640 [retrieved on Apr. 3, 2007].

(Continued)

*Primary Examiner* — Ricky Ngo
*Assistant Examiner* — Dewanda Samuel
(74) *Attorney, Agent, or Firm* — Liem T. Do

(57) ABSTRACT

Apparatus and methods for generation and use of reference signals in a wireless communications system are described. A group-specific reference signal pattern may be generated for provision to a group of UEs or terminals in communication with an eNodeB or base station. The reference signal may be generated based on system parameters. Reference signals may be generated to span multiple contiguous physical resource blocks.

91 Claims, 19 Drawing Sheets

(56) References Cited

FOREIGN PATENT DOCUMENTS

| WO | WO2008103317 | 8/2008 |
| WO | WO2008115588 | 9/2008 |
| WO | WO-2008118067 A2 | 10/2008 |
| WO | 2009037580 A2 | 3/2009 |

OTHER PUBLICATIONS

International Search Report and Written Opinion—PCT/US2010/029437, International Search Authority—European Patent Office—Aug. 27, 2010.

Motorola: "Proposal for Dedicated Pilots in Downlink Precoding for EUTRA MIMO", [Online] vol. RI-070770, No. 48, Feb. 12, 2007, pp. 1-5, XP002494688 Retrieved from the Internet: URL:http://www.3gpp.org/ftp/tsg_ran/WG1_RL1/TSGRI_48/Docs.

Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.

Taiwan Search Report—TW099110008—TIPO—Apr. 8, 2013.

Toshiba Corporation, Further Study on Reference Signal Structure for MBMS, 3GPP TSG-RAN WG1 #46 R1-062194, Aug. 28, 2006.

* cited by examiner (Precoded Embodiment)

*(Unprecoded Embodiment)*

METHODS AND APPARATUS FOR GENERATION AND USE OF REFERENCE SIGNALS IN A COMMUNICATIONS SYSTEM

CROSS-REFERENCE TO RELATED APPLICATIONS

This application claims priority under 35 U.S.C. §119(e) to U.S. Provisional Patent Application Ser. No. 61/165,456, entitled METHOD AND APPARATUS DESIGN OPTION FOR REFERENCE SIGNAL FOR DEMODULATION, filed on Mar. 31, 2009, the content of which is incorporated by reference herein in its entirety for all purposes.

BACKGROUND

1. Field of the Invention

This application is directed generally to wireless communications systems. More particularly, but not exclusively, the application is related to methods and apparatus for generation and use of reference signals in LTE communications systems.

2. Relevant Background

Wireless communication systems are widely deployed to provide various types of communication content such as voice, data, video and the like. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments or UEs). Each terminal communicates with one or more base stations via transmissions on forward and reverse links. The forward link (also referred to as a downlink) refers to the communication link from the base stations (also known as access points or APs) to the terminals, and the reverse link (also referred to as an uplink) refers to the communication link from the terminals to the base stations. These communication links may be established via a single-in-single-out, single-in-multiple out, multiple-in-single-out or a multiple-in-multiple-out (MIMO) system. In MIMO systems, multiple antennas are used in both transmitters and receivers to improve communications performance without requiring additional transmit power or bandwidth. Next generation systems such as Long Term Evolution (LTE) allow for use of MIMO technology for enhanced performance and data throughput.

SUMMARY

This disclosure relates generally to apparatus and methods for providing reference signals in communications systems. For example, in an LTE communications system, a demodulation reference signal pattern may be generated and transmitted based on system parameters or other parameters or characteristics. The reference signal pattern may be defined over a plurality of contiguous physical resource blocks.

In one aspect, this disclosure relates to a method for transmitting reference signals in a communications system, the method including transmitting a first reference signal specific to a first group of user devices and transmitting a common reference signal to a second group of user devices, wherein the second group of user devices includes the first group of user devices.

In another aspect, this disclosure relates to an apparatus for use in a communications system, the apparatus including a reference signal selection module configured to select a first reference signal specific to a first group of user devices and a common reference signal specific to a second group of user devices, wherein the second group of user devices includes the first group of user devices and a transmit module configured to transmit the first reference signal and the common reference signal.

In another aspect, this disclosure relates to a method for signal reception in a communications system, the method including receiving, at a user device, a first reference signal specific to a group of user devices, receiving, at the user device, a second reference signal specific to the user device, and deriving a channel estimate based on at least the first reference signal and the second reference signal.

In another aspect, this disclosure relates to an apparatus for use in a communications system, the apparatus including a receiver module configured to receive a first reference signal specific to a group of user devices and a second reference signal specific to a user device and a channel estimation module configured to derive a channel estimate based on at least the first reference signal and the second reference signal.

In another aspect, this disclosure relates to a computer program product comprising a computer-readable medium including codes for causing a computer to transmit a first reference signal specific to a first group of user devices and transmit a common reference signal to a second group of user devices, wherein the second group of user devices includes the first group of user devices.

In another aspect, this disclosure relates to a computer program product comprising a computer-readable medium including codes for causing a computer to receive, at a user device, a first reference signal specific to a group of user devices, receive, at the user device, a second reference signal specific to the user device and derive a channel estimate based on at least the first reference signal and the second reference signal.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Figure 1:
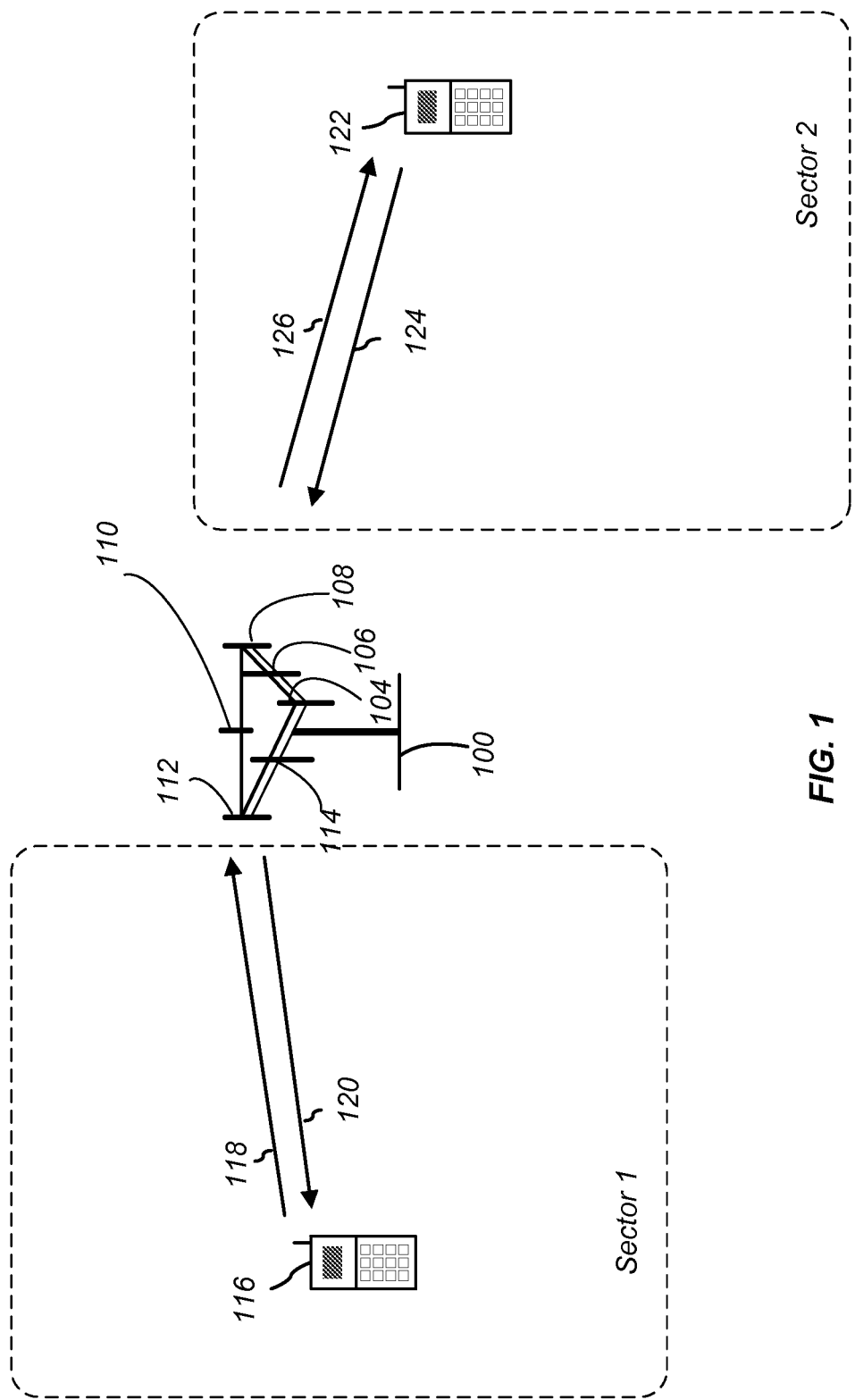
FIG. 1 illustrates a multiple access wireless communication system on which embodiments may be implemented.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

This disclosure relates generally to apparatus and methods for providing reference signals in communications systems. For example, in an LTE communications system, a demodulation reference signal pattern may be generated and transmitted based on system parameters or other parameters or characteristics. The reference signal pattern may be defined over a plurality of contiguous physical resource blocks.

In one aspect, this disclosure relates to a method for transmitting reference signals in a communications system, the method including transmitting a first reference signal specific to a first group of user devices and transmitting a common reference signal to a second group of user devices, wherein the second group of user devices includes the first group of user devices.

In addition, the method may include transmitting a second reference signal specific to a user device. The first reference signal may be precoded along a data direction associated with the first group of user devices. The second reference signal may be precoded along a data direction associated with the user device. Precoding may be used to implement beamforming so as to direct a transmitted signal in a particular direction or directions.

Alternately, the first reference signal may be precoded along a data direction different from a data direction associated with the first group of user devices. The second reference signal may also be precoded along a data direction different from a data direction associated with the user device.

In addition, the method may include transmitting a channel estimation signal, with the channel estimation signal including information usable to estimate a channel associated with a user device and/or the first group of user devices. The information may include reference signal weighting data. The reference signal weighting data may be associated with the first reference signal, the second reference signal and/or and the common reference signal.

In addition, the first reference signal may be based at least in part on a system parameter. The system parameter may be a channel condition or characteristic. The channel condition may be a time selectivity of the channel. The channel condition may be a frequency selectivity of the channel. The first reference signal pattern may be based on available resource elements in a transmitted signal. The system parameter may also be a rank. Corresponding apparatus, means and/or computer readable media may be provided to implement the method.

In another aspect, this disclosure relates to a method for transmitting a reference signal, the method including selecting a time frequency resource area and a first subset of time-frequency resource elements included within the time-frequency resource area to carry a first reference signal, the first subset of time-frequency resource elements defining a first reference signal pattern over the time-frequency resource area disposed for channel estimation and transmitting the first reference signal to a first group of user devices.

The method may also include selecting a second subset of time-frequency resource elements to carry a second reference signal, the second subset of time-frequency resource elements defining a second reference signal pattern and transmitting the second reference signal to a second group of user devices. The first reference signal pattern may be of a first reference-signal density, with the first reference-signal density being selected in accordance with at least one system parameter. The system parameter may be a rank of transmission. The system parameter may relate to a number of user devices within the first group of user devices operating at ranks of transmission greater than a threshold rank of transmission.

The system parameter may comprise a channel condition or characteristic. The channel characteristic may be a time selectivity of the channel. The channel characteristic may be a frequency selectivity of the channel.

The time-frequency resource area may comprise a single time-frequency resource block. Alternately, the time-frequency resource area may comprise at least first and second contiguous time-frequency resource blocks. The first and second contiguous time-frequency resource blocks may be contiguous in time. The first and second contiguous time-frequency resource blocks may be contiguous in frequency.

The time-frequency resource area may comprise a first number of contiguous time-frequency resource blocks wherein the first number is based upon at least one system parameter. Corresponding apparatus, means and/or computer readable media may be provided to implement the method.

In another aspect, this disclosure relates to an apparatus for use in a communications system, the apparatus including a reference signal selection module configured to select a first reference signal specific to a first group of user devices and a common reference signal specific to a second group of user devices, wherein the second group of user devices includes the first group of user devices; and a transmit module configured to transmit the first reference signal and the common reference signal.

In another aspect, this disclosure relates to an apparatus for use in a communications system, the apparatus including a reference signal pattern selection module configured to select a time frequency resource area and a first subset of time-frequency resource elements included within the time-frequency resource area to carry a first reference signal, the first subset of time-frequency resource elements defining a first reference signal pattern over the time-frequency resource area disposed for channel estimation; and a transmit module configured to transmit the first reference signal to a first group of user devices.

In another aspect, this disclosure relates to a method for signal reception in a communications system, the method including receiving, at a user device, a first reference signal specific to a group of user devices, receiving, at the user device, a second reference signal specific to the user device, and deriving a channel estimate based on at least the first reference signal and the second reference signal.

The method may further include receiving, at the user device, a common reference signal, and wherein the deriving a channel estimate includes deriving the channel estimate based at least on the first reference signal, the second reference signal and the common reference signal. The first reference signal may be carried by a first subset of time-frequency resource elements included within a time-frequency resource area, the first subset of time-frequency resource elements defining a first reference signal pattern over the time-frequency resource area and the second reference signal is carried by a second subset of time-frequency resource elements included within the time frequency resource area, the second subset of time-frequency resource elements defining a second reference signal pattern over the time-frequency resource area, the second reference signal pattern being different from the first reference signal pattern.

Alternately, the first reference signal may be carried by a first subset of time-frequency resource elements included within a time-frequency resource area, the first subset of time-frequency resource elements defining a first reference signal pattern over the time-frequency resource area, the second reference signal is carried by a second subset of time-frequency resource elements included within the time frequency resource area, the second subset of time-frequency resource elements defining a second reference signal pattern over the time-frequency resource area and the common reference signal is carried by a third subset of time-frequency resource elements included within the time frequency resource area, the third subset of time-frequency resource elements defining a third reference signal pattern over the time-frequency resource area, wherein the first reference signal pattern, the second reference signal pattern and the third reference signal patterns comprise different signal patterns.

The method may further include receiving a data signal at the user device and demodulating the data signal at least in part based on the channel estimate. The method may further include receiving a channel estimation signal, said channel estimation signal including information usable to estimate a channel associated with the first group of user devices; and wherein the deriving a channel estimate is further based on the channel estimation signal. The information may includes reference signal weighting data. The reference signal weighting data may be associated with the first reference signal and the second reference signal.

The first reference signal may be based at least in part on a system parameter. The system parameter may be a rank. The system parameter may be a channel condition or characteristic. The channel condition may be a time selectivity of the channel. The channel condition may be a frequency selectivity of the channel.

The second reference signal may be based at least in part on a system parameter. The system parameter may be a rank. The system parameter may be a channel condition. The channel condition may be a time selectivity of the channel. The channel condition may be a frequency selectivity of the channel. Corresponding apparatus, means and/or computer readable media may be provided to implement the method.

In another aspect, this disclosure relates to an apparatus for use in a communications system, the apparatus including a receiver module configured to receive a first reference signal specific to a group of user devices and a second reference signal specific to a user device and a channel estimation module configured to derive a channel estimate based on at least the first reference signal and the second reference signal.

In another aspect, this disclosure relates to a computer program product comprising a computer-readable medium including codes for causing a computer to transmit a first reference signal specific to a first group of user devices and transmit a common reference signal to a second group of user devices, wherein the second group of user devices includes the first group of user devices.

In another aspect, this disclosure relates to a computer program product comprising a computer-readable medium including codes for causing a computer to select a time frequency resource area and a first subset of time-frequency resource elements included within the time-frequency resource area to carry a first reference signal, the first subset of time-frequency resource elements defining a first reference signal pattern over the time-frequency resource area disposed for channel estimation and transmit the first reference signal to a first group of user devices.

In another aspect, this disclosure relates to a computer program product comprising a computer-readable medium including codes for causing a computer to receive, at a user device, a first reference signal specific to a group of user devices, receive, at the user device, a second reference signal specific to the user device and derive a channel estimate based on at least the first reference signal and the second reference signal.

In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is an upcoming release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For clarity, certain aspects of the apparatus and techniques are described below for LTE, and LTE terminology is used in much of the description below; however, the description is not intended to be limited to LTE applications. Accordingly, it will be apparent to one of skill in the art that the apparatus and methods described herein may be applied to various other communications systems and applications.

Single carrier frequency division multiple access (SC-FDMA), which utilizes single carrier modulation and frequency domain equalization, is one communications technique of interest. SC-FDMA has similar performance and essentially the same overall complexity as OFDMA systems: however, an SC-FDMA signal has lower peak-to-average power ratio (PAPR) because of its inherent single carrier structure. As a result, SC-FDMA has drawn great attention recently, especially for uplink communications where lower PAPR greatly benefits the mobile terminal in terms of transmit power efficiency. Use of SC-FDMA is currently a working assumption for uplink multiple access schemes in 3GPP Long Term Evolution (LTE), or E-UTRA.

Logical channels in wireless communications systems may be classified into Control Channels and Traffic Channels. Logical Control Channels may comprise a Broadcast Control Channel (BCCH) which is a downlink (DL) channel for broadcasting system control information, a Paging Control Channel (PCCH) which is a DL channel that transfers paging information and a Multicast Control Channel (MCCH) which is a Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a Point-to-point bi-directional channel that transmits dedicated control information and is used by UEs having an RRC connection.

Logical Traffic Channels may comprise a Dedicated Traffic Channel (DTCH) which is Point-to-point bi-directional channel, dedicated to one UE, for the transfer of user information, and a Multicast Traffic Channel (MTCH) for Point-to-multipoint DL channel for transmitting traffic data.

Transport Channels may be classified into Downlink (DL) and Uplink (UL). DL Transport Channels comprises a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to PHY resources which can be used for other control/traffic channels. The UL Transport Channels may comprise a Random Access Channel (RACH), a Request Channel (REQCH), an Uplink Shared Data Channel (UL-SDCH) and a plurality of PHY channels. The PHY channels may comprise a set of DL channels and UL channels.

In addition, the DL PHY channels may comprise the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels may comprise the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any embodiment described herein as "exemplary" is not necessarily to be construed as preferred or advantageous over other embodiments.

For purposes of explanation of various embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper Field TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which May be used as reference symbols after demodulation). The uplink transmissions may allow for estimation of a space-selective channel via multiple antennas.

In LTE implementations orthogonal frequency division multiplexing is used for the downlink—that is, from the base station, access point or eNodeB to the terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Figure 3:
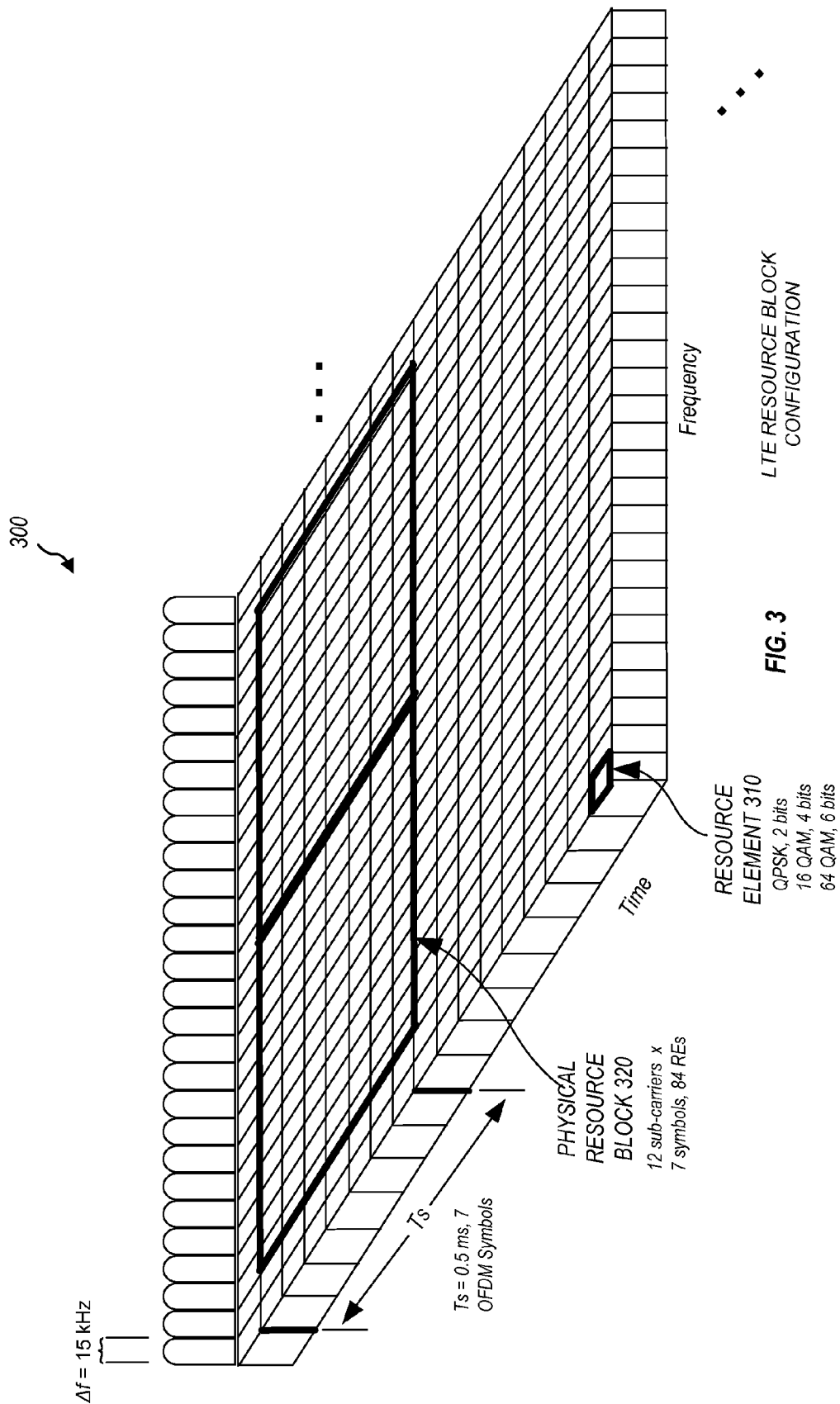
FIG. 3 illustrates time-frequency resource blocks and resource elements in an LTE system.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. An example RB in an LTE implementation is illustrated in FIG. 3. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an example implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as listed previously. In particular, the PDCCH is used for sending control, the PHICH for sending ack/nack, the PCFICH for specifying the number of control symbols, to Physical Downlink Shared Channel (PDSCH) for the data transmission, the Physical Multicast Channel (PMCH) for broadcast transmission using a Single Frequency Network, as well as the Physical Broadcast Channel (PBCH) for sending important system information within the cell. Supported modulation formats on the PDSCH in LTE are QPSK, 16QAM and 64QAM.

In the uplink there are three physical channels. While the Physical Random Access Channel (PRACH) is only used for initial access and when the UE is not uplink synchronized, the data is sent on the Physical Uplink Shared Channel (PUSCH). If there is no data to be transmitted on Uplink for a UE, control information would be transmitted on the Physical Uplink Control Channel (PUCCH). Supported modulation formats on the uplink data channel are QPSK, 16QAM and 64QAM.

If virtual MIMO/Spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

Attention is now directed to FIG. 1, which illustrates a multiple access wireless communication system. In various implementations, an access point, such as AP 100 of FIG. 1, may be a fixed station used for communicating with access terminals and may be referred to as an access point, eNodeB, home eNobeB (HeNB) or by other terminology. An access terminal, such as AT 116 or AT 122 of FIG. 1, may be called an access terminal, user equipment (UE), a wireless communication device, terminal, access terminal or by other terminology. ATs 116 and 122 and UE 100 may be configured to implement various aspects of embodiments as are described herein.

As shown in FIG. 1, an access point (AP) 100 includes multiple antenna groups, with one group including antennas 104 and 106, another including antennas 108 and 110, and an additional group including antennas 112 and 114. In FIG. 1, only two antennas are shown for each antenna group; however, more or fewer antennas may be utilized for each antenna group in various embodiments.

Access terminal (AT) 116 is in communication with antennas 112 and 114, where antennas 112 and 114 transmit information to AT 116 over forward link 120 and receive information from AT 116 over reverse link 118. Access terminal (AT) 122 is in communication with antennas 106 and 108, where antennas 106 and 108 transmit information to AT 122 over forward link 126 and receive information from AT 122 over reverse link 124. In a frequency division duplex (FDD) system, communication links 118, 120, 124 and 126 may use different frequencies for communication between AP 100 and ATs 116 and 122. For example, forward link 120 may use a different frequency than that used by reverse link 118. Likewise, links 124 and 126 may use different frequencies than each other and/or than links 118 and 120.

Each group of antennas and/or the area in which they are designed to communicate may be referred to as a sector of the access point. In the illustrated embodiment, antenna groups are each designed and configured to communicate with access terminals in a designated sector of the area covered by AP 100. For example, the antenna group including antennas 112 and 114 may be assigned to a sector designated as Sector 1 in FIG. 1, while the antenna group including antennas 106 and 108 may be assigned to Sector 2.

In communication over forward links 120 and 126, the transmitting antennas of access point 100 may be configured to utilize beamforming in order to improve the signal-to-noise ratio of forward links for the different ATs 116 and 122, as well as others (not shown). Also, in typical implementations, an access point using beamforming to transmit to access terminals scattered randomly throughout its coverage area will generally cause less interference to access terminals in neighboring cells than an access point transmitting through a single antenna to all its access terminals. Precoding of transmit signals may be used to facilitate beamforming.

Figure 2:
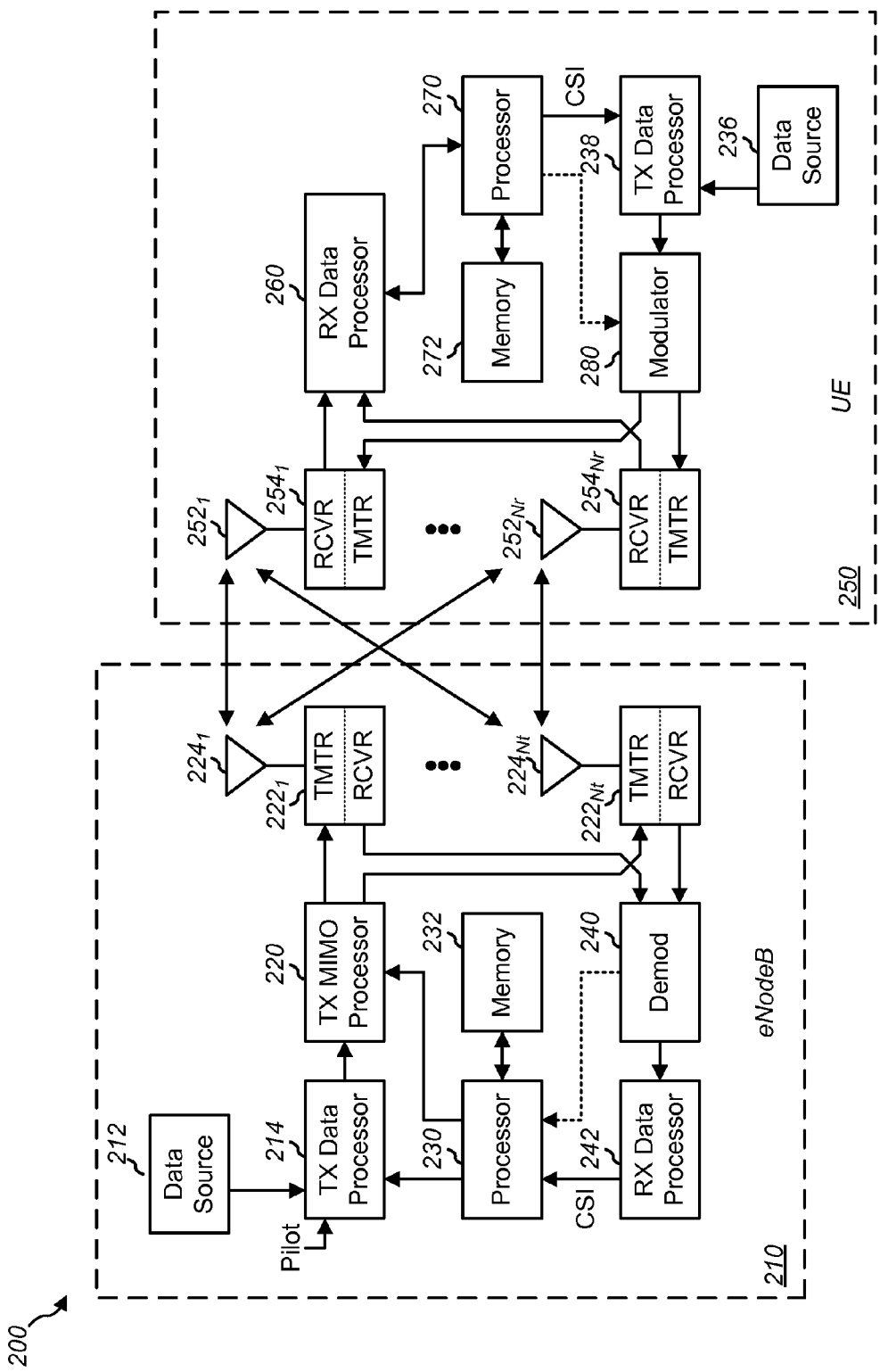
FIG. 2 is a block diagram of an embodiment of a MIMO communications system.

Attention is now directed to FIG. 2, which illustrates a block diagram of an embodiment of a transmitter system 210 (i.e., an access point or AP) and a receiver system 250 (i.e., an access terminal or AT) in an example MIMO system 200. These systems may correspond to AP 100 and ATs 116 and 122 of FIG. 1. Generation and use of various reference signal configurations as described herein may provide advantages in various MIMO system implementations. Reference signals and channel estimation signals may be generated in one or more modules of AP 210 for transmission to AT 250. AT 250 may include one or more modules to receive the reference signals to estimate channel characteristics and/or demodulate received data. In one embodiment, AP 210 may generate or select reference signals as described herein. This may be done in a reference signal selection module including one or more components (or other components not shown) of AP 210, such as processors 214, 230 and memory 232. AP 210 may also include a transmit module including one or more components (or other components not shown) of AP 210, such as transmit modules 224. AP 210 may also include a reference signal pattern generation module including one or more components (or other components not shown) of AP 210. Likewise, AT 250 may include a receive module including one or more components of AT 250 (or other components not shown), such as receivers 254. AT 250 may also include a channel estimation module including one or more components (or other components not shown) of AT 250, such as processors 260 and 270, and memory 272. In one embodiment, multiple reference signals received at AT 250 are processed to estimate a channel characteristic. A channel estimation signal provided from AP 210 may also be received at AT 250, and the channel estimation signal may be used to weight the multiple reference signals to estimate the channel characteristic.

Memories 232 and 272 may be used to store computer code for execution on one or more processors to implement processes as are described herein.

In operation, at the transmitter system 210, traffic data for a number of data streams may be provided from a data source 212 to a transmit (TX) data processor 214, where it may be processed and transmitted to one or more receiver systems 250.

In one embodiment, each data stream is processed and transmitted over a respective transmitter sub-system (shown as transmitters $224_1$-$224_{Nt}$) of transmit system 210. TX data processor 214 receives, formats, codes, and interleaves the traffic data for each data stream based on a particular coding scheme selected for that data stream so as to provide coded data. In particular, transmit system 210 may be configured to determine a particular reference signal and reference signal pattern and provide a transmit signal including the reference signal in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may comprise a reference signal. Pilot data may be provided to TX data processor 214 as shown in FIG. 2 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 230 based on instructions stored in memory 232, or in other memory or instruction storage media of transmit system 250 (not shown).

The modulation symbols for all data streams may then be provided to a TX MIMO processor 220, which may further process the modulation symbols (e.g., for OFDM implementation). TX MIMO processor 220 may then provide Nt modulation symbol streams to Nt transmitters (TMTR) $222_1$ through $222_{Nt}$. The various symbols may be mapped to associated RBs for transmission.

In certain embodiments, TX MIMO processor 220 may apply beamforming weights to the symbols of the data streams and corresponding to the one or more antennas from which the symbol is being transmitted. This may be done by using information such as channel estimation information provided by or in conjunction with the reference signals. For example, a beam B=transpose([b1 b2 ... $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as $B1 \times 1 + B2 \times 2 + BN_s \times N_s$, where $N_s$ beams are transmitted and xi is the modulation symbol sent using beam Bi. In various implementations beams could be selected in a number of ways. For example, beams could be selected based on channel feedback from UE2 and/or based on channel knowledge available at the eNB.

Each transmitter sub-system $222_1$ through $222_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $222_1$ through $222_{Nt}$ are then transmitted from $N_t$ antennas $224_1$ through $224_{Nt}$, respectively.

At receiver system 250, the transmitted modulated signals are received by $N_r$ antennas $252_1$ through $252_{Nr}$, and the received signal from each antenna 252 is provided to a respective receiver (RCVR) $254_1$ through $252_{Nr}$. Each receiver 254 conditions (e.g., filters, amplifies and downconverts) a respective received signal, digitizes the conditioned signal to provide samples, and further processes the samples to provide a corresponding "received" symbol stream.

An RX data processor 260 then receives and processes the $N_r$ received symbol streams from $N_r$ receivers $254_1$ through $252_{Nr}$ based on a particular receiver processing technique so as to provide $N_s$ "detected" symbol streams so at to provide estimates of the $N_s$ transmitted symbol streams. The RX data processor 260 then demodulates, deinterleaves, and decodes each detected symbol stream to recover the traffic data for the data stream. The processing by RX data processor 260 is typically complementary to that performed by TX MIMO processor 220 and TX data processor 214 in transmitter system 210.

A processor 270 may periodically determine a precoding matrix for use as is described further below. Processor 270 may then formulate a reverse link message that may comprise a matrix index portion and a rank value portion. In various embodiments, the reverse link message may comprise various types of information regarding the communication link and/or the received data stream. The reverse link message may then be processed by a TX data processor 238, which may also receive traffic data for a number of data streams from a data source 236 which may then be modulated by a modulator 280, conditioned by transmitters $254_1$ through $254_{Nr}$, and transmitted back to transmitter system 210.

At transmitter system 210, the modulated signals from receiver system 250 are received by antennas 224, conditioned by receivers 222, demodulated by a demodulator 240, and processed by an RX data processor 242 to extract the reserve link message transmitted by the receiver system 250. Processor 230 then determines which pre-coding matrix to use for determining beamforming weights, and then processes the extracted message.

In one aspect, a channel structure may be used that preserves low PAR (e.g., at any given time, the channel is contiguous or uniformly spaced in frequency) properties of a single carrier waveform.

In another aspect, reference signals may be associated with one or more resource blocks (RBs). In some implementations, RSs may be associated with two or more RBs, which may be contiguous in time and/or frequency.

FIG. 3 illustrates an example configuration of a resource block as defined for an LTE implementation. In particular a RB is comprised of multiple resource elements (REs) within a time slot. In the example shown, the time slot, Ts, has a duration of 0.5 ms, and includes 7 OFDM symbols. The RB includes 12 subcarriers, each of 15 kHz bandwidth, thereby having a total bandwidth of 180 kHz. Consequently, the example RB comprises 84 REs in a 12×7 configuration.

In an exemplary embodiment, Demodulation Reference Signals (Also denoted as a DM-RS or RS for brevity), along with, in some implementations, signaling from the transmitting nodes, enables the receiver to obtain an estimate of the channel experienced by data packets. The DM-RS may be precoded or unprecoded in various implementations. The receiver may be that of a single UE or a group of UEs in Downlink transmissions and an NodeB or multiple NodeBs in the Uplink scenario.

In some embodiments, the DM-RS may be specific to a UE (referred to herein as a UE-RS or UE-specific RS) and may be transmitted in spatial directions specific to the UE. If the same directions are used in transmission of the data, the choice of these directions may be transparent to the receiver.

Figure 4A:
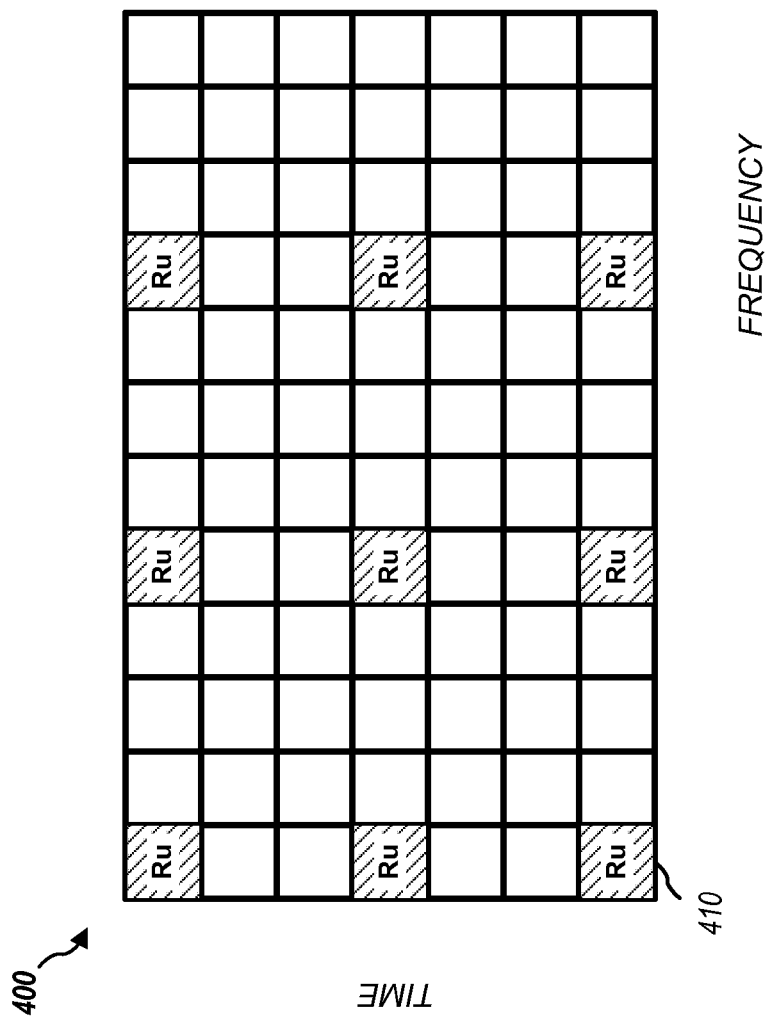
FIG. 4A illustrates an implementation of reference signal configuration for a UE-specific case.

Attention is now directed to FIG. 4A which illustrates details of a UE-specific reference signal defined for a physical resource block (RB) 400. The reference signal tone, denoted as "Ru," may be defined in a pattern of REs within a single RB 400. In the example pattern shown in FIG. 4A, the time and frequency spacing of those resource elements 410 allocated to an Ru are configured so at to facilitate determination of channel characteristics over the respective time and frequency elements, and facilitate interpolation of the channel for time or frequency slots lacking the reference signal. Consequently, the particular reference signal pattern used may be generated or selected based on various system and/or channel characteristics. For example, a more dense pattern in time or frequency spacing may be selected in a system with a rapidly changing channel so as to provide for more frequent time and/or sub-carrier channel estimates (i.e. based on the frequency and/or time selectivity of the channel). A less dense pattern may be used to facilitate higher data rates and/or a specific required data throughput. In general, a less time/frequency selective channel will require the use of fewer REs to create the reference signal pattern than a more time/frequency selective channel.

In addition, the particular reference signal pattern may be selected based on other system parameters such as the rank of operation. In one MIMO implementation, the UE estimates throughput based on different ranks. The US may use channel estimates obtained from Common RS or CSI-RS to obtain estimates of throughput. The UE may then report a rank to provide an optimal throughput. In SU-MIMO, the Node B may then use the reported rank for the UE. In MU-MIMO, the number of UEs paired and the overall rank used at the Nodbe B may be based on similar information provided from multiple UEs in the system. The reference signal pattern may then be selected based on the rank selection. In general, more REs will be used to define the reference signal pattern when higher ranks are employed as channel characteristics corresponding to more streams need to be estimated. However, the channel conditions supported for different ranks could be different, which could impact the choice of the density of DM-RSs.

Although FIG. 4A illustrates a particular reference signal pattern, it is noted that the example shown in FIG. 4A is provided for purposes of illustration, not limitation, and that other patterns of resource elements populated by reference signal Ru may be provided within RB 400 in various other implementations.

Figure 4B:
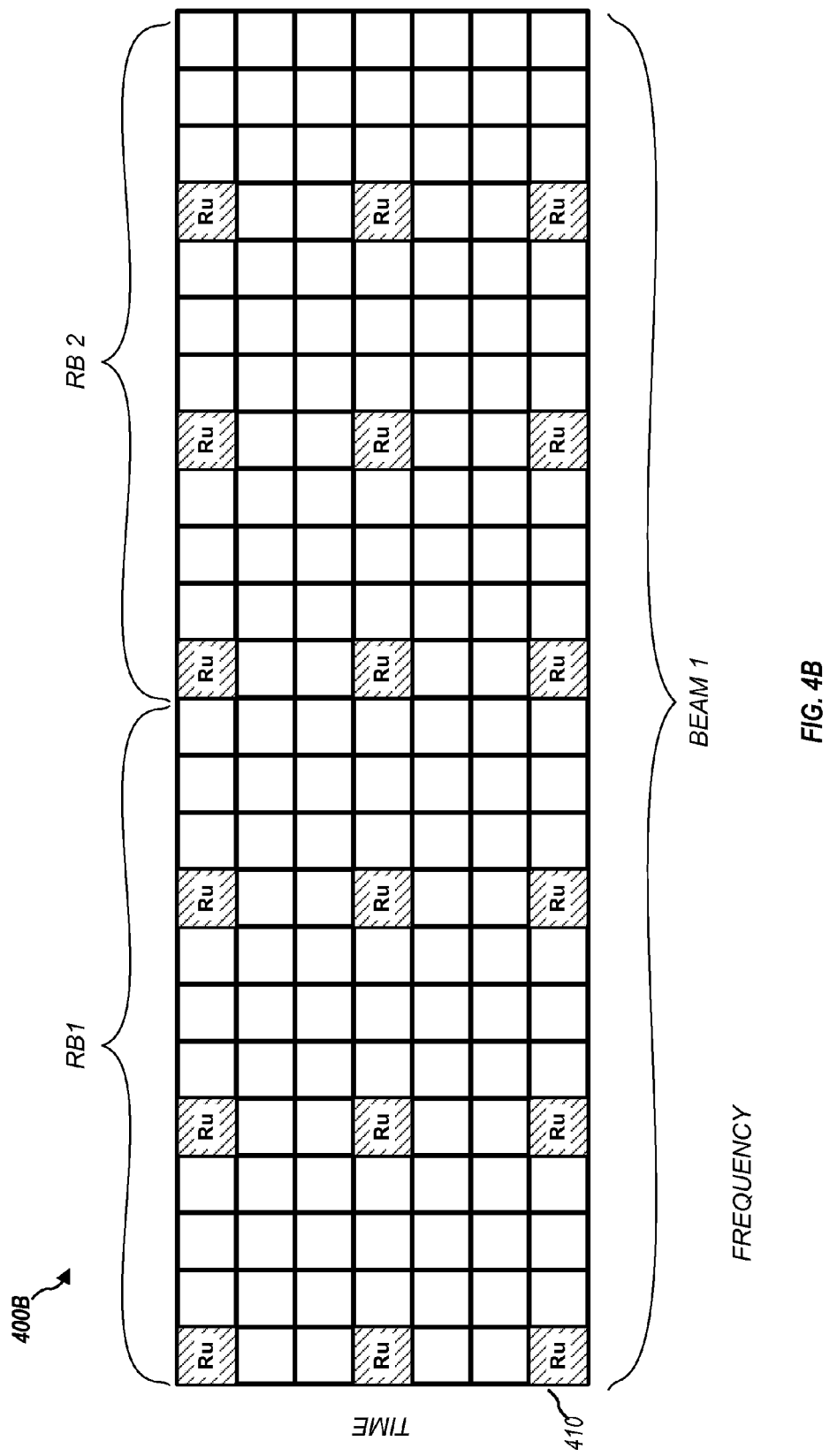
FIG. 4B illustrates an implementation of a reference signal configuration for a multi-block UE-specific resource area case that is frequency contiguous.
Figure 4C:
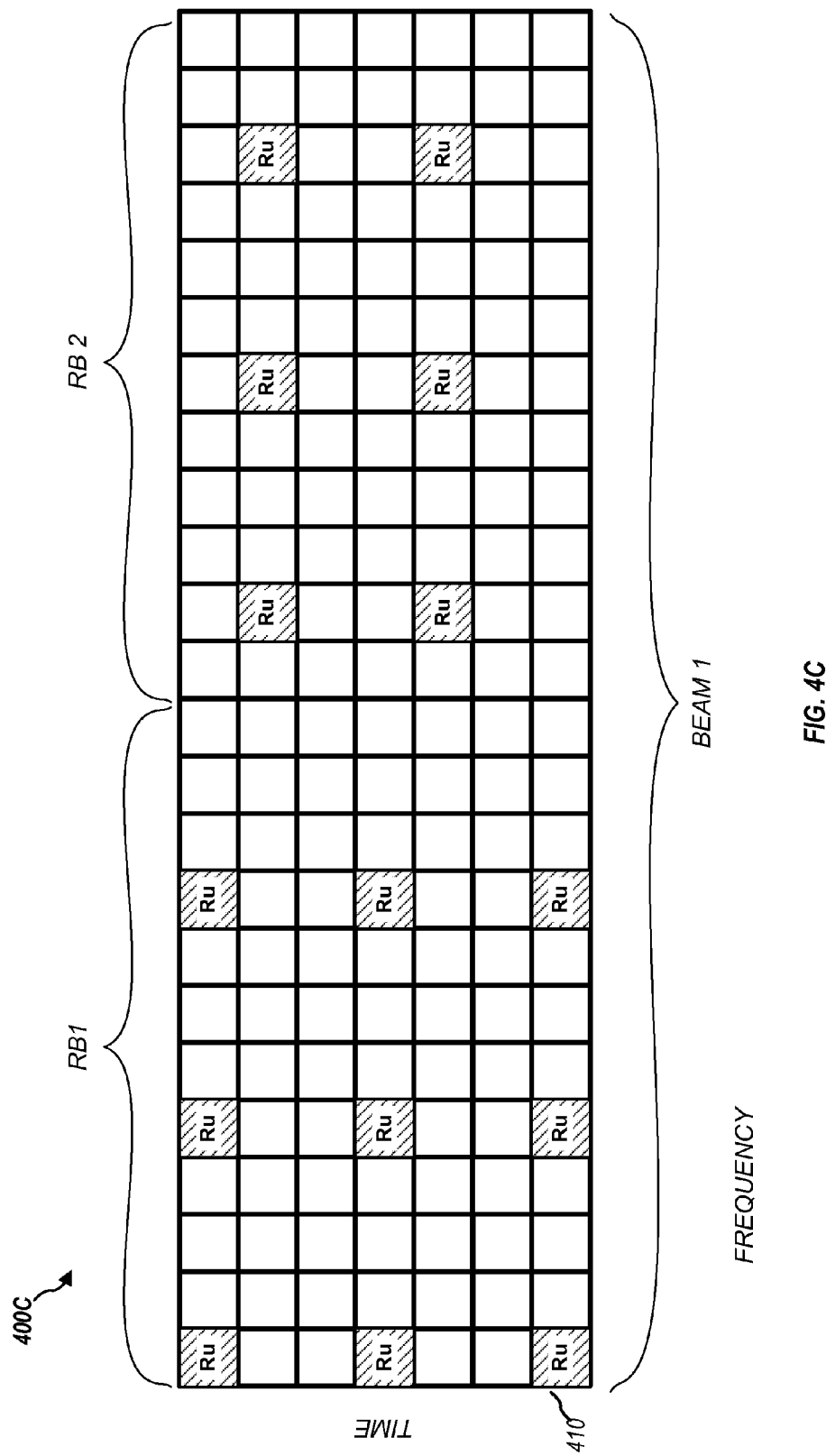
FIG. 4C illustrates an implementation of another reference signal configuration for a multi-block UE-specific case that is frequency contiguous.
Figure 4D:
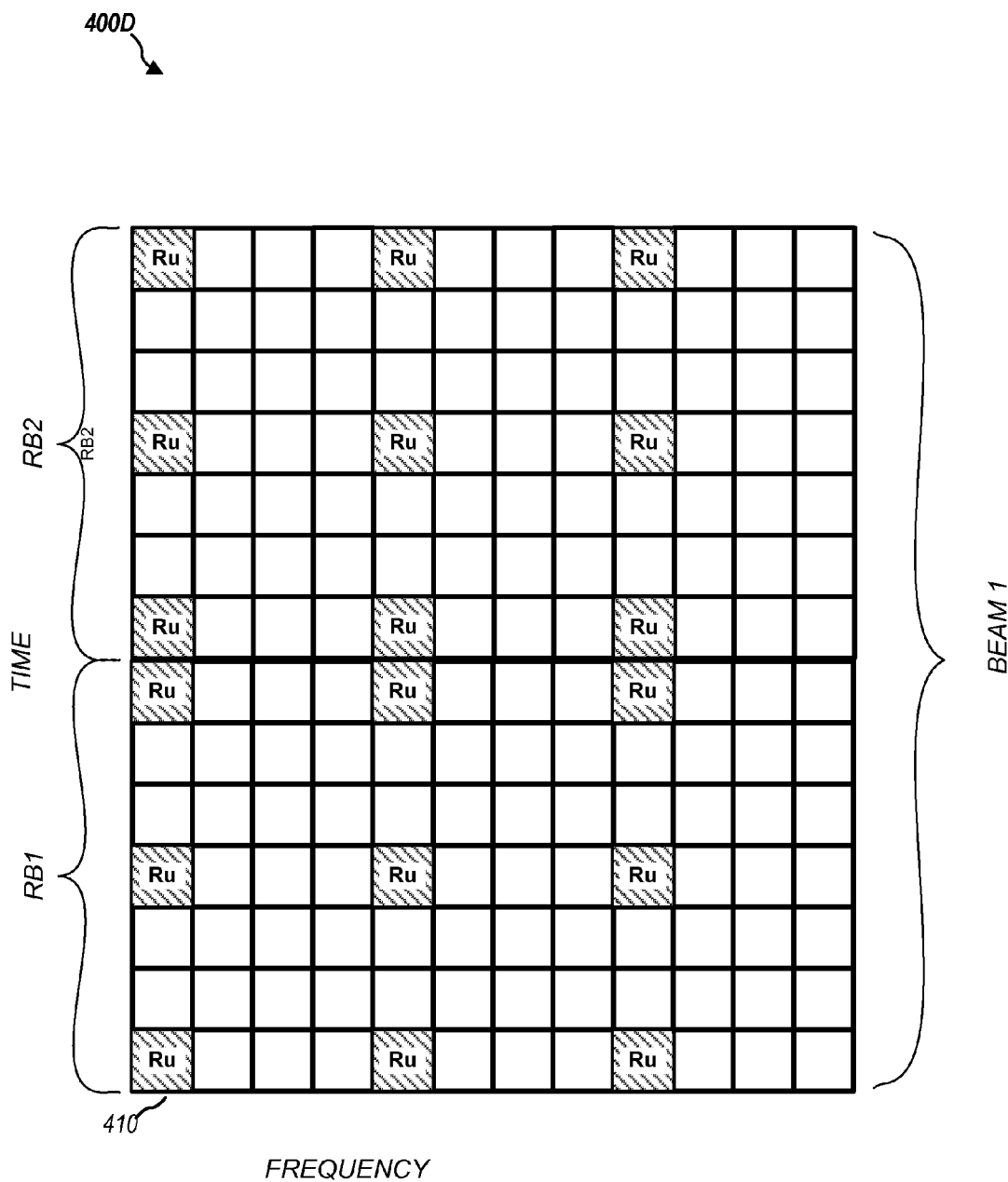
FIG. 4D illustrated an implementation of a reference signal configuration for a multi-block UE-specific case that is time contiguous.

The reference signal pattern may also be defined so as to span a resource area larger than a single RB. For example, the reference signal pattern may be defined to span two or more RBs. In some implementations this plurality of RBs may be contiguous in time, frequency or both. Examples of reference signal patterns spanning multiple resource blocks are illustrated in FIGS. 4B through 4E. FIG. 4B illustrates an example of a frequency-contiguous pair of resource blocks having a UE-specific reference signal defined over the pair. In some implementations the reference signal pattern may repeat over the plurality of RBs as shown in FIG. 4B. Alternately, in some implementations the pattern may be different for adjacent RBs in the plurality of RBs as is shown in FIG. 4C. FIGS. 4D and 4E illustrate additional examples of multi-block UE-specific reference signal patterns for two resource blocks that are time-contiguous. In FIG. 4D, a two resource block repetitive UE-specific reference signal pattern is illustrated. It is noted that when the DM-RS pattern is defined across multiple RBs (for example, K RBs), the UEs scheduled using this DM-RS pattern may have to be scheduled in groups of K RBs and the precoding applied (e.g., beams used) for all the RBs in a group so as to be the same. Using pattern across multiple RBs (also referred to as bundling across RBs) allows reducing the pilot density per RB to obtain similar quality of channel estimate, but it may add scheduler constraints as noted previously. In general different patterns may be defined for different bundling sizes.

In some implementations a reference signal may be defined and provided for a group of users in the system. This is denoted herein as a "Group-UE RS," "group-specific reference signal," or "Rg." In this case, the relevant information of the Group-UE RS (such as, for example, location, directions it is to be transmitted in), when present, may be signaled to the group of intended UEs or it may be based on a pre-defined rule known at the UE(s) and eNodeB(s) in the system. In the implementations described with respect to FIG. 4, each UE has a specific reference signal and/or associated pattern assigned to it. Alternately, by providing a shared reference signal to groups of UEs, overall system performance may be enhanced. This approach may facilitate selection of beams so at to maximize the rate of users within groups, while minimizing interference.

Figure 5A:
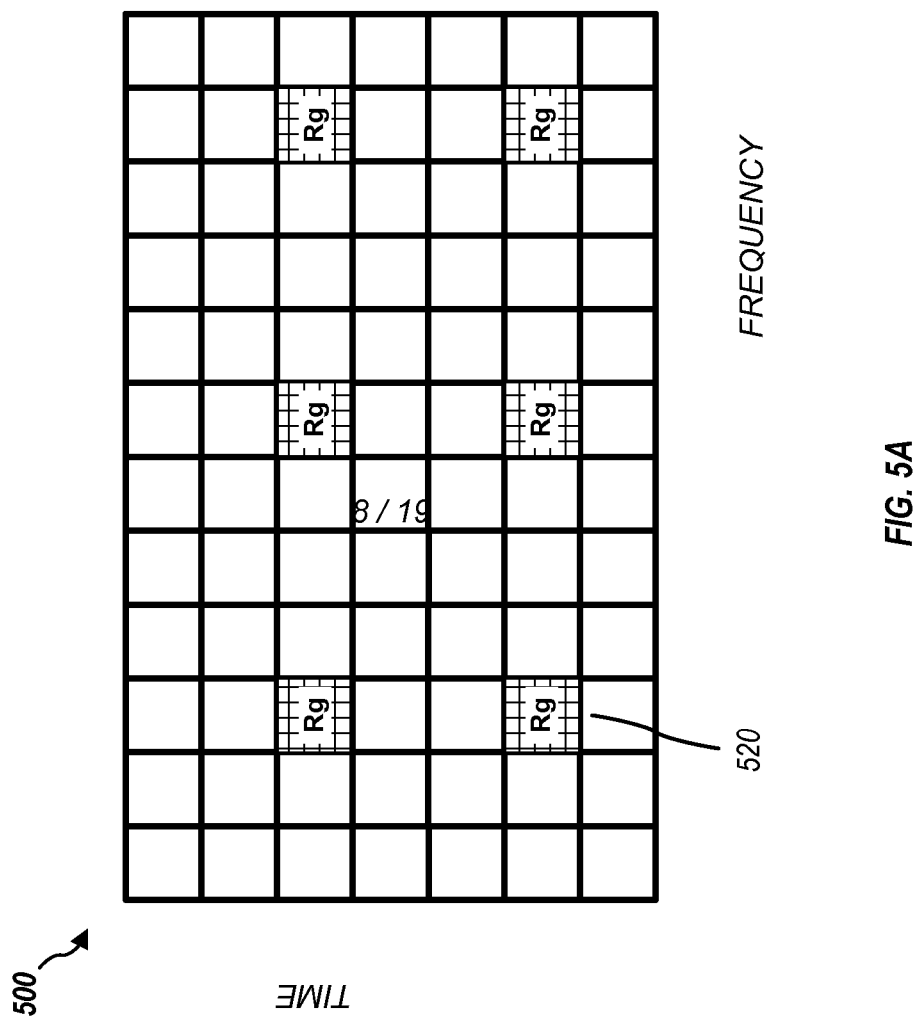
FIG. 5A illustrates an implementation of a reference signal configuration for a group-specific case.

FIG. 5A illustrates one example of a resource block (RB) 500 in which a plurality of REs 510 are used to convey a group-specific reference signal, denoted as "Rg". In this example, Rg is provided at particular intervals using the resource elements of resource block 500 to form a particular group-specific pattern. The particular pattern employed may be generated or selected based on various system and/or channel characteristics. For example, a more dense pattern in time or frequency spacing may be selected in a system with a rapidly changing channel characteristic so as to provide for more frequent time and/or sub-carrier channel estimates. A less dense pattern may be used to facilitate higher data rates and/or required data throughput. In addition, the particular group-specific reference signal pattern may be selected based on other system parameters such as the rank of operation.

Although FIG. 5A illustrates a particular group-specific reference signal pattern, it is noted that the example shown in FIG. 5A is provided for purposes of illustration, not limitation, and that other patterns of resource elements within RB 500 may be used to convey group-specific resource signals in various other implementations.

Figure 5B:
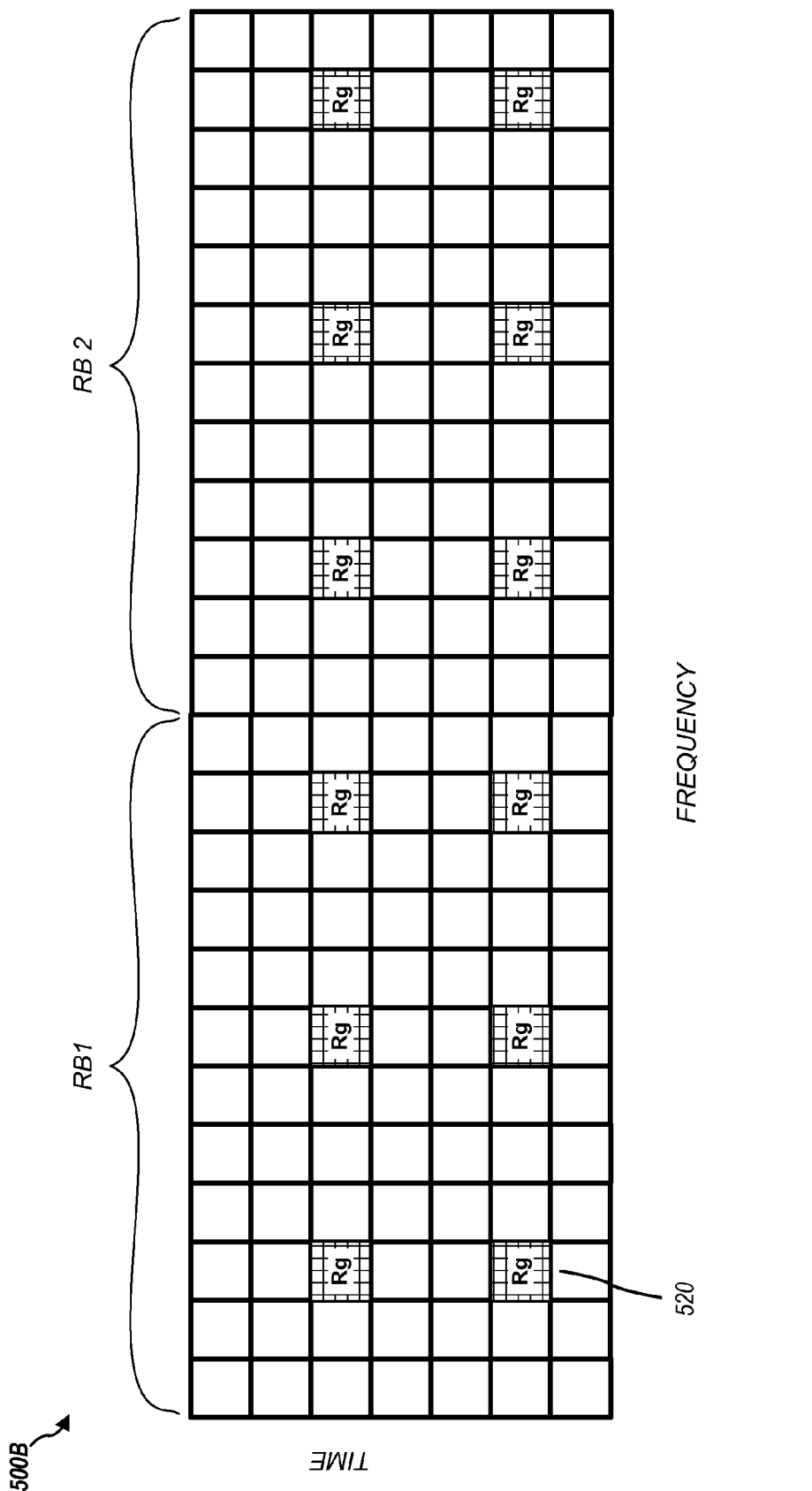
FIG. 5B illustrates an implementation of a reference signal configuration for a multi-block group-specific resource area case that is frequency contiguous.
Figure 5C:
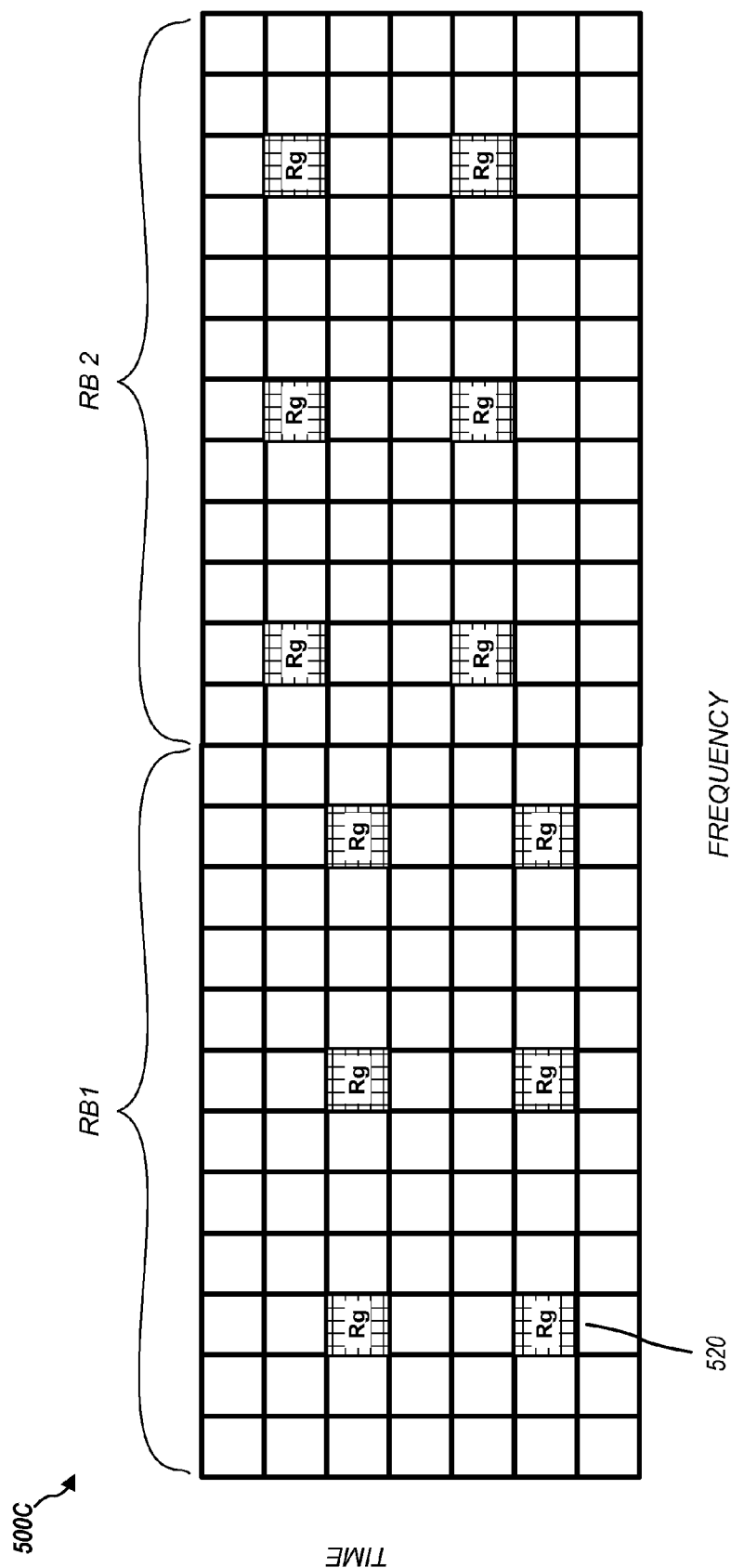
FIG. 5C illustrates another implementation of a reference signal configuration for a multi-block group-specific case that is frequency contiguous.
Figure 5D:
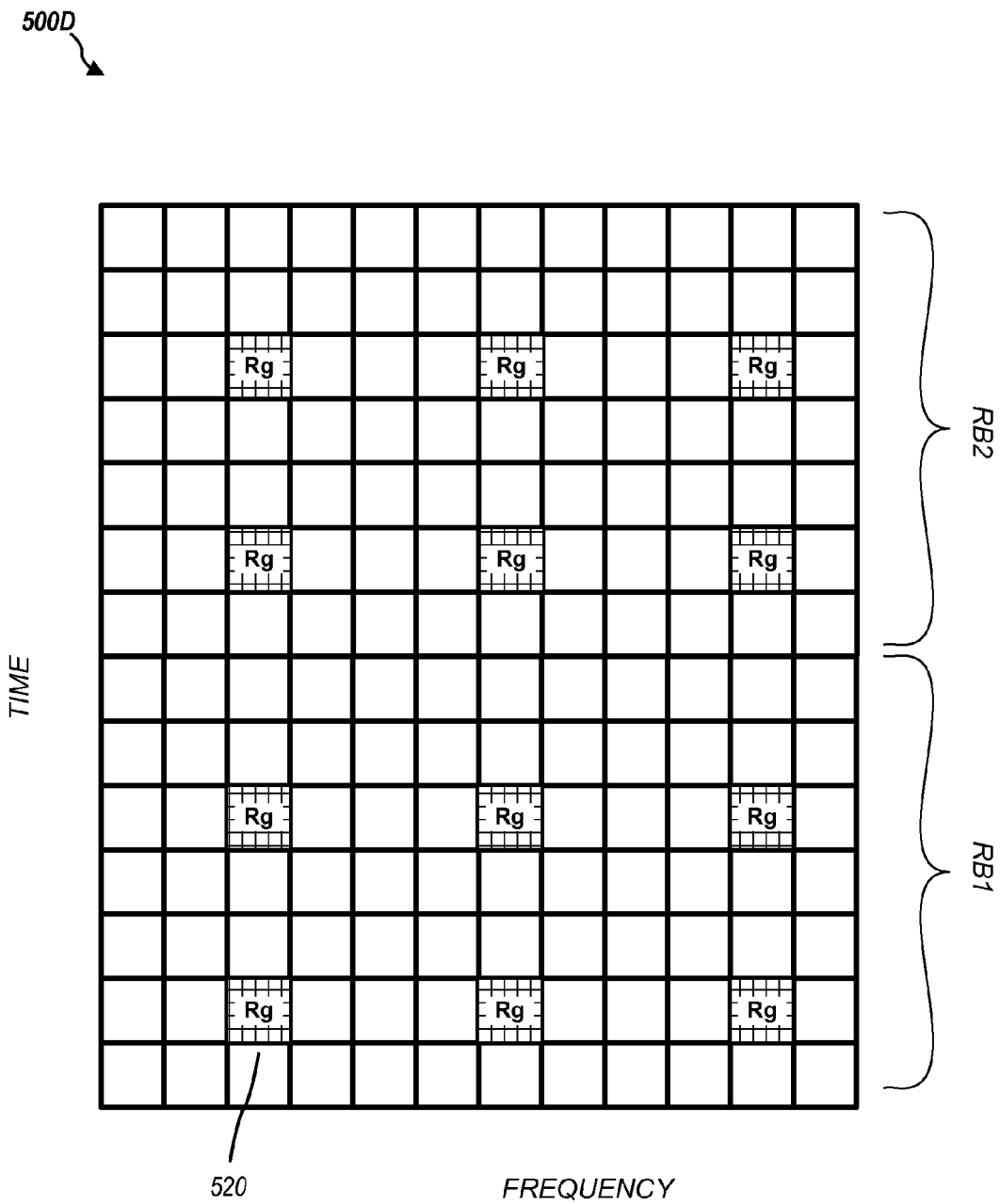
FIG. 5D illustrates an implementation of a reference signal configuration for a multi-block group-specific case that is time contiguous.
Figure 5E:
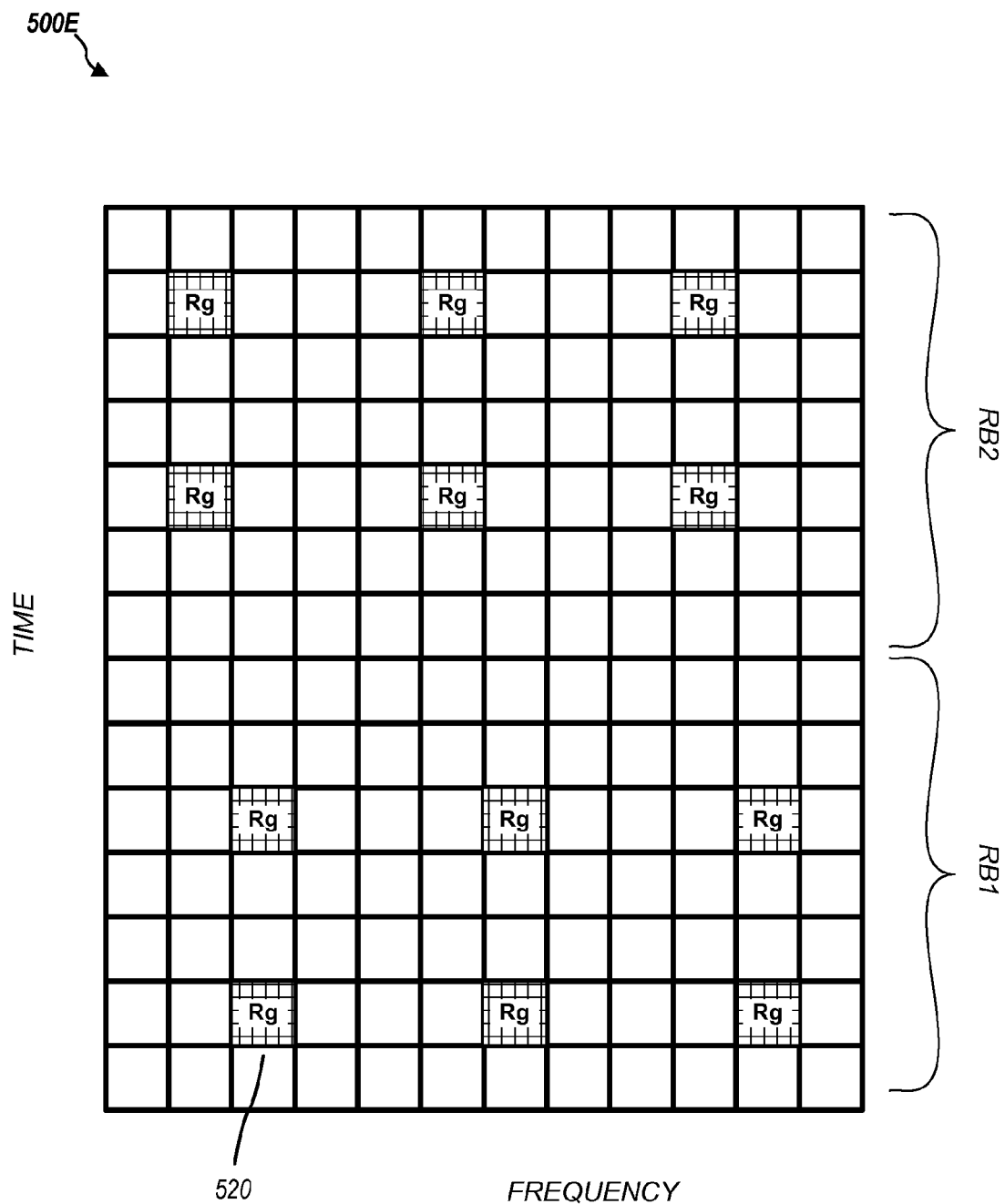
FIG. 5E illustrates an implementation of a reference signal configuration for a multi-block group-specific case that is frequency contiguous.

A group-specific reference signal pattern may also be defined so as to span two or more RBs. In some implementations this plurality of RBs may be contiguous in time, frequency or both. Examples of multiple resource block implementations of group-specific reference signal patterns are illustrated in FIGS. 5B through 5E. FIG. 5B illustrates an example of a frequency-contiguous pair of resource blocks having a group-specific reference signal defined over the pair. In some implementations the pattern may repeat over the plurality of RBs as shown in FIG. 5B. Alternately, in some implementations the pattern may be different for adjacent RBs in the plurality of RBs as is shown in FIG. 5C. FIGS. 5D and 5E illustrate additional examples of multi-block group reference signal patterns for two resource blocks that are time-contiguous. In FIG. 5D, a two resource block repetitive group-specific reference signal pattern is illustrated. FIG. 5E illustrates a two resource block non-repetitive group-specific reference signal pattern.

Figure 6:
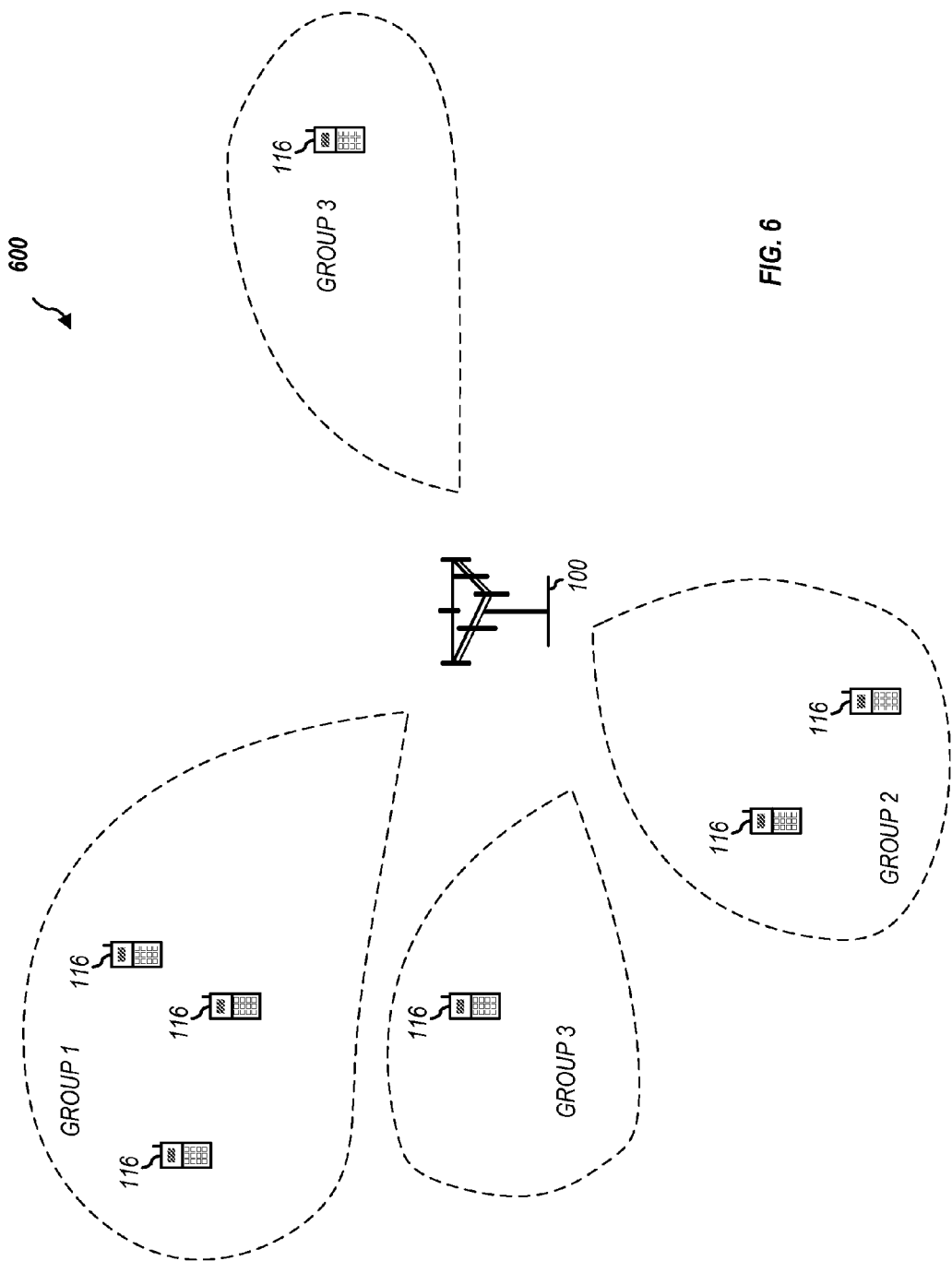
FIG. 6 illustrates an example configuration of UEs and an eNodeB in a group configuration.

Attention is now directed to FIG. 6, which illustrates an embodiment of a system 600 configured to provide transmit signals having group-specific reference signal patterns. System 600 includes a base station or eNodeB 100, as well as multiple handsets or UEs 116. These may correspond to the UEs and the eNodeB as shown in FIG. 1. Based upon a particular configuration of UEs 116 in communication with eNodeB 100, the eNodeB 100 may select one or more groups of UEs 116. This selection may be based on location of the UEs, channel characteristics, data requirements and/or other system parameters. Selection of groups and associated group elements (UEs) may be based on proximity of the location of the UEs 116 to the eNodeB 110, or may be based on other criteria, such as throughput requirements. In addition, different groups may include different numbers of UEs.

In the example system 600 shown in FIG. 6, three groups, denoted as Group 1, Group 2, and Group 3 have been configured. Group 1 includes 3 UEs that may be in physical proximity, Group 2 includes 2 UEs, and Group 3 includes 2 UEs that are not in physical proximity. In various implementations, a variety of different configurations of elements and location arrangements may be used.

In system 600, eNodeB 100 may receive information associated with the capabilities of the various UEs 116, the channel characteristics, data throughput requirements, and/or other system characteristics and parameters. These may then be used to allocate groups of UEs, as well as to select group specific reference signals for use in communication with the respective groups. This selection process may include selection of a particular reference signal sequence and/or a particular reference signal pattern within a resource block as shown in FIGS. 5A-5E.

The reference signal pattern may be based on one or more system patterns, and may include varying densities in various implementations. For example, in a system having a rapidly changing channel characteristic, it may be desirable to use a pattern that utilizes more resource elements (and thereby provide greater reference signal density) in order to facilitate more granular channel estimates. Conversely, where the channel is not changing rapidly, utilizing a less dense pattern may be used to facilitate higher data rates or guarantee a minimum required data throughput. As one example, a pattern may include 3 looks or REs in time versus two. The pattern could be selected at the eNB based on knowledge of UE speed (higher speed more looks in time, lower speed less looks in time) and the delay spread seen for the UE channel. Larger delay spread would generally require more looks in frequency, lower delay spread fewer looks in frequency. The speed (or more generally Doppler spread which is a measure of variation in time) and the delay spread (measure of variation in frequency) could be estimated at the eNB. For example, using estimates of Doppler and delay spread of the reverse link channel for forward link. They could be obtained directly/indirectly through feedback reports from UE. For example if the PMI report for different subbands are very different, the channel is likely to be very frequency selective. Variations in the CQI reports could be used to determine low or high speed. They may also be based on deployment conditions for example near highways the speed of UEs is likely to be more so those eNB could use different pattern than the ones in city with slow moving vehicles.

In addition to providing group specific reference signals, in some implementations, eNodeB 100 may also configured to provide signaling information associated with the reference signal patterns to the UEs 116. This may be done by, for example, specifying the reference pattern corresponding to the UE, information about the group reference pattern and/or one or more directions in which the reference signals are transmitted. This information may be transmitted in control channels within the system.

Figure 7A:
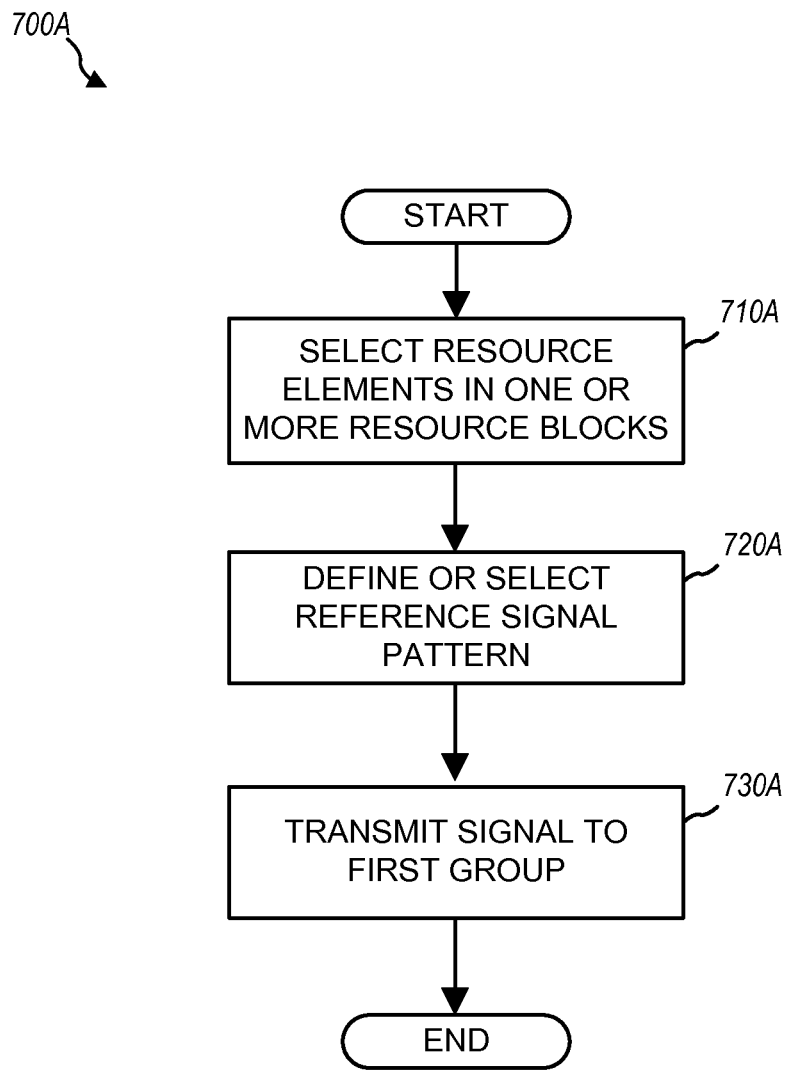
FIG. 7A illustrates a process for selecting a group-specific reference signal pattern.

Attention is now directed to FIG. 7A which illustrates details of an embodiment of a process 700A for providing signals in a configuration using group-specific reference signals, such as system 600 of FIG. 6. Process 700A may be performed in response to a system change, such as addition or removal of UEs, and/or may be performed periodically or continuously in various system implementations. At step 710A, resource elements for use in transmitting the group-specific reference signal may be selected. These resource elements may be grouped into a pattern for use with the group-specific reference signal at step 720A.

In some implementations the group-specific reference signal pattern may be dynamically configured, whereas in other implementations it may be predefined or selected from a group or set of patterns that may be stored in a memory. The pattern is typically defined in terms of a set of resource elements within a resource block. As described previously, this set may be based on various system parameters and characteristics, such as channel characteristics, transmission rank, data rate requirements, and other parameters and characteristics as described previously. In some implementations the group-specific reference signal pattern may be defined so as to span a single resource block. Alternately, the group-specific reference signal pattern may be defined to span two or more resource blocks. The resource blocks may be contiguous in time, frequency or both. Information on the pattern used and associated information defining the reference signals may be dynamically transferred between the eNodeB and UEs and/or may be based on a predefined rule known by the eNodeB and UEs.

Figure 10:
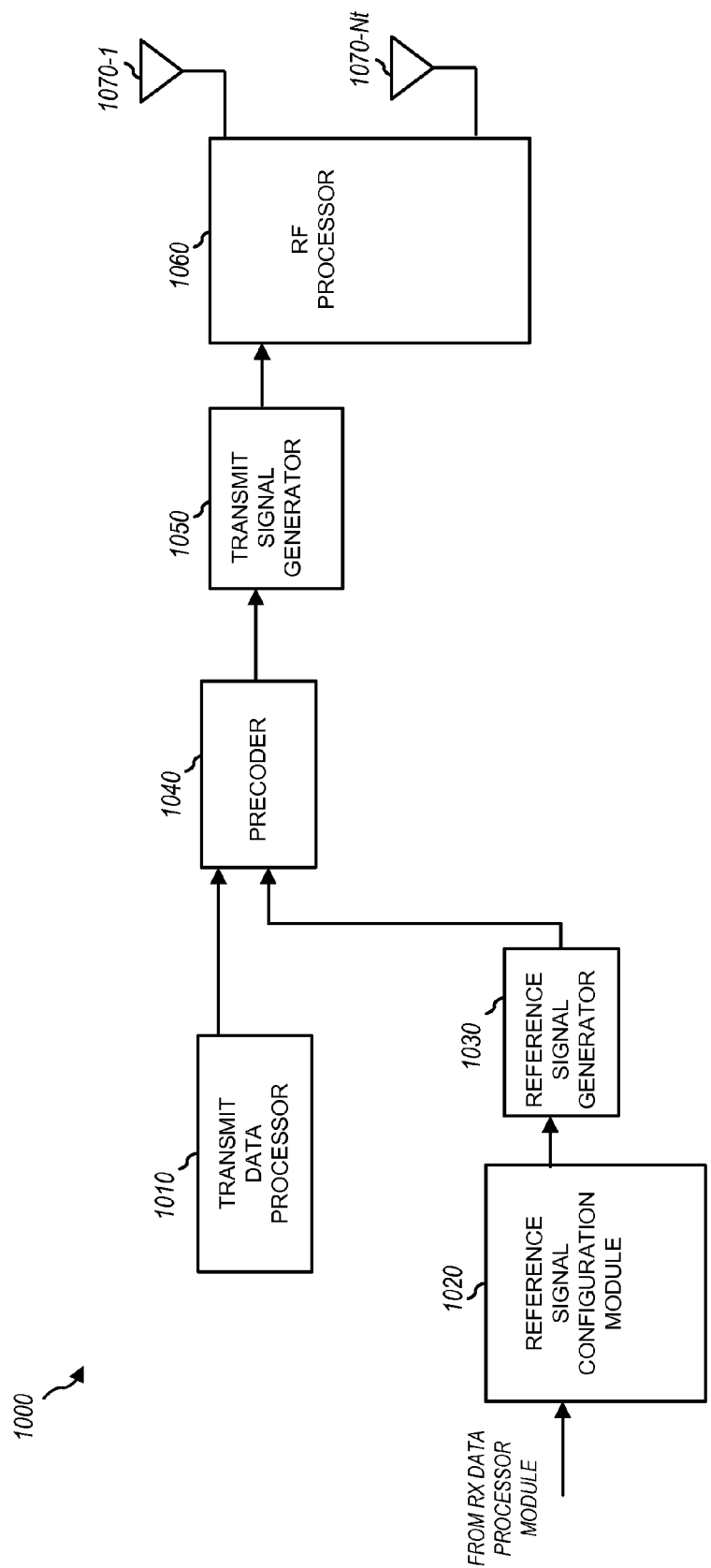
FIG. 10 illustrates an example of transmission of a precoded reference signal.
Figure 11:
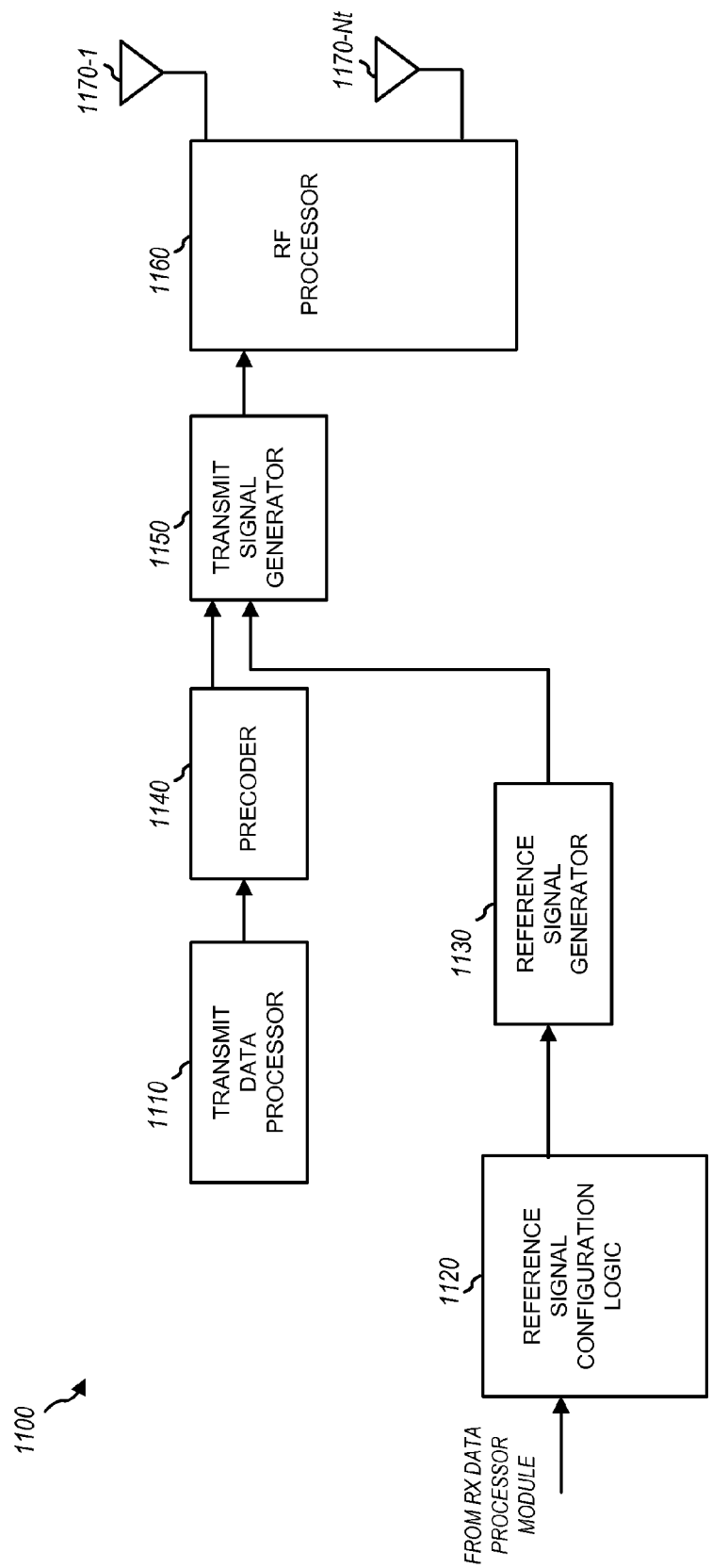
FIG. 11 illustrates an example of transmission of an unprecoded reference signal.

Having defined or selected the group-specific reference signal pattern, a particular reference signal for transmission may be chosen. The reference signal typically composes of reference signals for different beams. One implementation uses a different RS for each UE and sends the one RS for each stream of the UE using the same beams as that used for the stream. Another option is to use send "unprecoded" RS where RS is sent along fixed beams (antenna ports), for example for each transmit antenna. UE is informed about the beam (linear combination of the antenna ports) used for precoding its streams. The UE then potentially uses all the transmitted RS and the beam information to estimate the channel along the beam directions used for its streams. As noted previously, the selected reference signal may then be precoded or may be unprecoded. Examples of precoded and unprecoded implementations are shown in FIG. 10 and FIG. 11, respectively. A transmit signal may then be generated that includes the reference signal in the group-specific pattern. The transmit signal may include control data and/or other data. At step 730A the group-specific reference signal may be transmitted to the UEs comprising the particular group. This may include, be preceded by, or accompanied by signaling information.

Figure 7B:
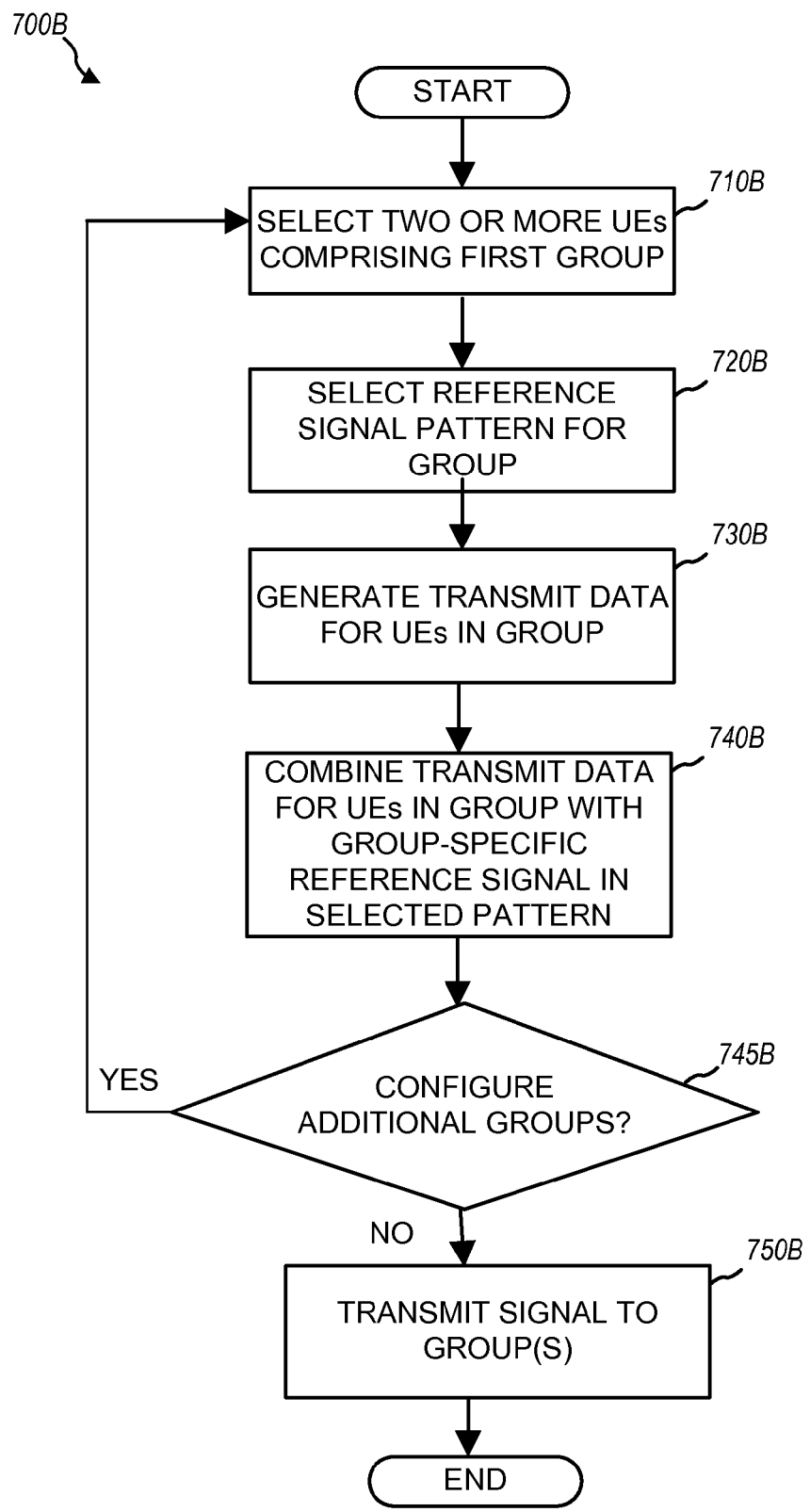
FIG. 7B illustrates a process for selecting a group for transmission of a group-specific reference signal.

FIG. 7B illustrates details of an implementation where UE groups may be selected by an eNodeB, such as in system 600. At step 710B, two or more UEs may be selected for a group. This may be based on characteristics or system parameters as described previously. A reference signal pattern for the group may be selected at step 720B. This may be done as described previously with respect to FIG. 7A. Data for transmission may be provided at step 720B. The data may be precoded. At step 730B, the data may be combined with the reference signal and configured in the allocated resource block or blocks. In some implementations the data may be precoded and the group-specific reference signal not precoded. In other implementations the data and reference signal may be combined and the combined data precoded. A step 745B may be included for configuring additional groups. If additional groups are configured, the process may repeat at step 710B for configuration of one or more additional groups. If no additional groups are configured, the signal may be transmitted to the UEs within the one or more configured groups.

In some implementations a combination of types of reference signals may be used. This combination of signals may be used to provide enhanced channel estimation during demodulation or for other purposes. For example, in some implementations a receiver may use a combination of UE-specific reference signals and group-specific reference signals. Other combinations may include combinations of UE-specific, group-specific and/or cell specific reference signals.

In some implementations, group-specific reference signals may be combined with legacy reference signals, such as, for example in LTE systems, a common RS (CRS) and/or a user-specific RS so as to perform channel estimation. A CRS may be provided to all UEs in communication with a particular eNodeB, such as all UEs in a cell or sector. In this configuration, relevant information regarding constructing the channel experienced by data from the channel observed by different reference signal types may be determined by signaling to the UE and/or by a predefined rule configured in the system.

In various implementations, the structure and pattern used for the reference signals may be dependent on different UE and system parameters, such as transmission mode, number of advertised legacy (such as LTE Legacy Common RSs), rank of transmission, channel conditions (time and frequency variations) and modulation and coding parameters used in data packet transmission. It may also be dependent on the number of users of a particular type or group. This may, for example, be based on the number of users with transmission rank of greater than a predefined or dynamically adjusted threshold.

Figure 8:
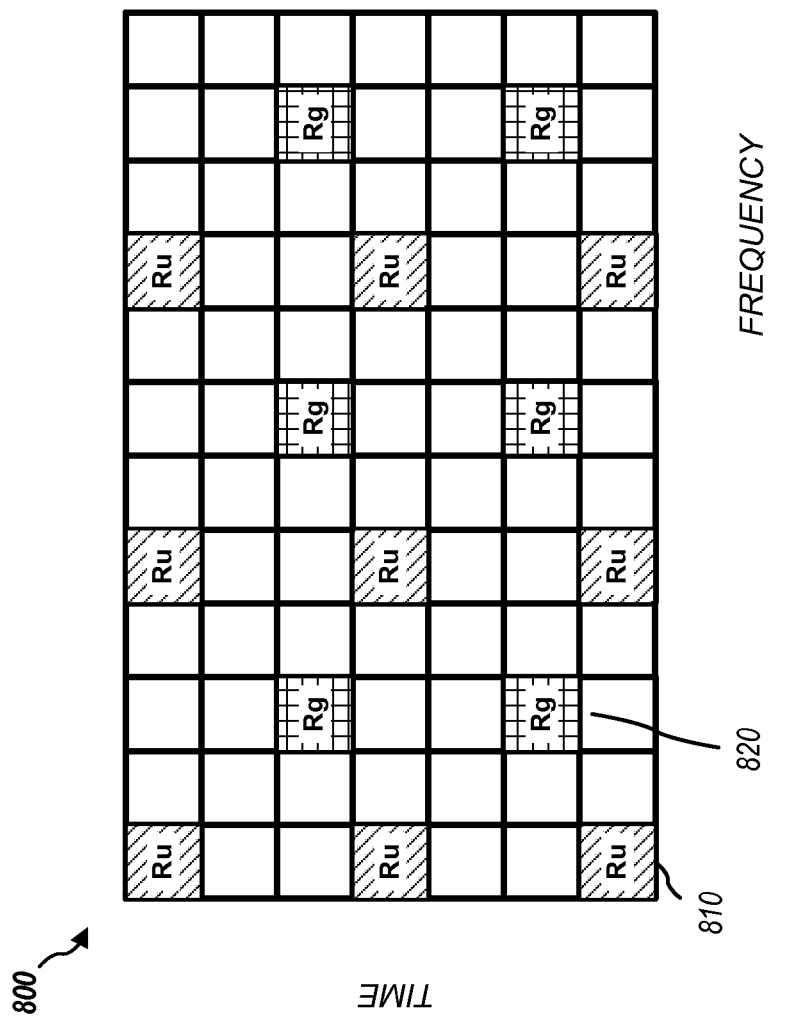
FIG. 8 illustrates a combination UE specific and group-specific reference signal pattern.

Attention is now directed to FIG. 8A, which illustrates one example of a manner in which both a group-specific and a user-specific reference signal may be transmitted using a resource block (RB) 800 As shown, the RB 800 includes REs 810 allocated for transmission of a user-specific reference signal, denoted as "Ru", and REs 820 allocated for transmission of a group-specific reference signal, denoted as "Rg" In this example, REs 820 are interleaved in RB 800 between REs 810, which may, for example, enhance channel estimation performance by providing additional reference signals. However, it is noted that the example shown in FIG. 8A is provided for purposes of illustration, not limitation, and therefore other patterns of resource elements may be allocated for particular combinations of group-specific and user-specific reference signals in other implementations.

Figure 9:
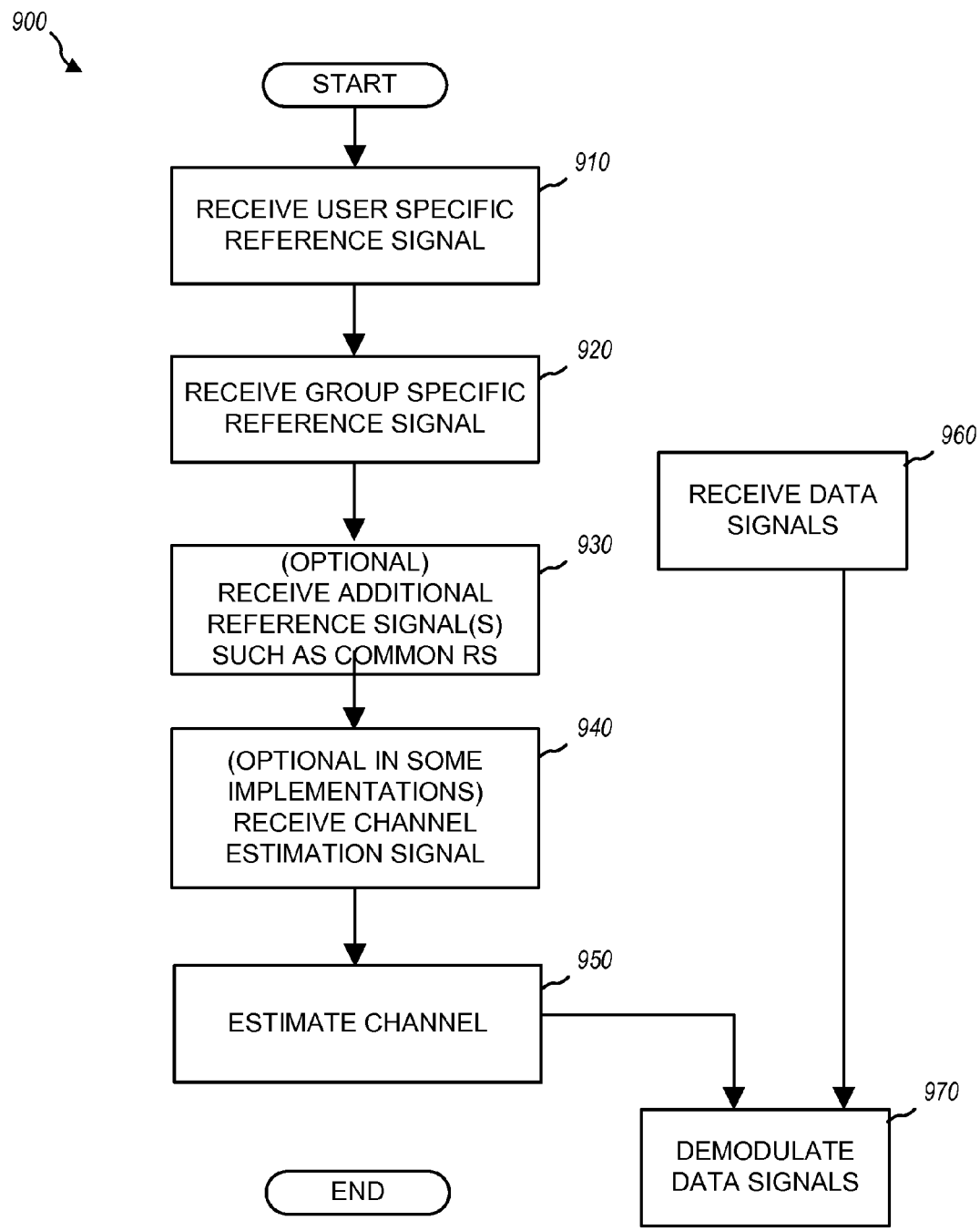
FIG. 9 illustrates an implementation of use of UE specific and group-specific reference signals for demodulation channel estimation.

Performance of various implementations may be enhanced by providing a combination of common or mandatory reference signals and group-specific reference signals. For example, in a system with 8 TX antennas and 4 CRS, if a UE needs to be served with rank 8, 8 UE specific RS may need to be transmitted. However, if the precoding is performed such that 4 layers use beamforming using the CRS antenna ports while the remaining 4 layers use other beams, the UE specific RS need to be transmitted only for the remaining 4 layers. Note that the PMI information for the first 4 layers will need to be conveyed to the UE. An example process for implementing this is shown in process 900 of FIG. 9. In process 900 two or more reference signals are received, such as at AT 250 of FIG. 2. These may include combinations of a common or mandatory reference signal and user and group-specific reference signals. In addition, in some implementations a channel estimation signal may be received. The channel estimation signal may include information for combining the reference signals to estimate the channel. At stage 950 the multiple reference signals may be processed, which may include weighting based on the channel estimation signal, to generate a channel estimate. The channel estimate may then be used to facilitate demodulation at stage 970 of data signals received at stage 960. The channel estimate may also be sent to other devices in the system, such as AT 210 of FIG. 2 and/or other devices.

In particular, in various designs the structure and pattern of the reference signals may include data describing or defining one or more system parameters including transmission mode, number of advertised legacy common RSs, rank of transmission, channel conditions, such as time and/or frequency variations, modulation parameters and coding parameters used in data packet transmission. In addition, the structure and pattern of the RSs may include data describing or defining one or more system parameters including the number of system users of a particular type or the number of users of a particular group. In another aspect, the density and time placement of the UE specific RS pattern may be dependent on the rank of transmission, the time selectivity (and variations) of the channel. The pattern and structure of the RSs may be further dependent on the frequency-time resources allocated for data transmission of the UE.

Attention is now directed to FIG. 10, which illustrates additional details of an embodiment 1000 of a transmit subsystem including a reference signal generation apparatus configured for providing a precoded reference signal. Reference signal configuration module 1020 may receive and/or request reference signal configuration data from an RX data processor module, such as module 260 as shown in FIG. 2. Reference signal configuration data may include data defining a particular reference signal sequence and/or a particular reference signal pattern for transmission. This may be, for example, a reference signal pattern and/or configuration as is described previously herein. Alternately, reference signal configuration module 1020 may retrieve reference signal sequence and/or pattern data from a memory or other data storage element. Reference signal configuration module 1020 may then determine an appropriate reference signal sequence and/or reference signal pattern for transmission, which may then be generated by a reference signal generator 1030 coupled to or incorporated in reference signal configuration module. The reference signal generator may then generate a reference signal and provide the reference signal to a precoder module 1040. Precoder module 1040 may also receive data for transmission from a transmit data processor module 1010. The transmit data and reference signal may be precoded in precoder module 1040 and may also be combined in a data stream to be provided to a transmit signal generator module 1050.

Transmit signal generator module 1050 may then provide a time domain transmit signal to RF processor module 1060, where a transmit signal may be generated and provided to one or more antennas 1070-1 to 1070-Nt, where Nt denotes the number of transmit antennas.

Attention is now directed to FIG. 11, which illustrates additional details of an embodiment 1100 of a transmit subsystem including a reference signal generation apparatus configured for providing a nonprecoded reference signal. Reference signal configuration logic 1120 may receive and/or request reference signal configuration data from an RX data processor module, such as module 260 as shown in FIG. 2. Reference signal configuration data may include data defining a particular reference signal sequence and/or a particular reference signal pattern for transmission. This may be, for example, a reference signal pattern and/or configuration as is described previously herein. Alternately, reference signal configuration logic 1120 may retrieve reference signal sequence and/or pattern data from a memory or other data storage element. Reference signal configuration module 1120 may then determine an appropriate reference signal sequence and/or reference signal pattern for transmission, which may then be generated by a reference signal generator 1130 coupled to or incorporated in reference signal configuration module 1120. The reference signal generator 1130 may then generate a reference signal and provide the reference signal to transmit signal generator module 1150. As shown, precoder 1140 may receive transmit data from a transmit data processor module 1110. The precoded transmit data from precoder 1140 and the reference signal from the reference signal generator 1130 are provided to a transmit signal generator module 1150, which generates a time domain transmit signal for RF processor module 1160. A transmit signal generated by RF processor module 1160 is then provided to one or more antennas 1170-1 to 1170-Nt, where Nt denotes the number of transmit antennas.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps in the processes disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the invention.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b and c.

It is intended that the following claims and their equivalents define the scope of the invention.

We claim:

1. A method for transmitting reference signals in a communications system, the method comprising:
   transmitting a first reference signal specific to a first group of user devices, the first reference signal having a first reference signal pattern based at least in part on a transmission mode of each user device of the first group, and the first reference signal having a first reference signal sequence based at least in part on a parameter associated with each user device of the first group; and
   transmitting a common reference signal to a second group of user devices, the common reference signal having a second reference signal pattern that is different from the first reference signal pattern, the common reference signal having a second reference signal sequence that is different from the first reference signal sequence, and the second group of user devices including the first group of user devices.

2. The method of claim 1 further comprising transmitting a second reference signal specific to a user device.

3. The method of claim 1 wherein the first reference signal is precoded along a data direction associated with the first group of user devices.

4. The method of claim 2 wherein the second reference signal is precoded along a data direction associated with the user device.

5. The method of claim 3 wherein a second reference signal is precoded along a data direction associated with the user device.

6. The method of claim 1 wherein the first reference signal is precoded along a data direction different from a data direction associated with the first group of user devices.

7. The method of claim 2 wherein the second reference signal is precoded along a data direction different from a data direction associated with the user device.

8. The method of claim 6 wherein a second reference signal is precoded along a data direction different from a data direction associated with the user device.

9. The method of claim 1 further including transmitting a channel estimation signal, said channel estimation signal including information usable to estimate a channel associated with the first group of user devices.

10. The method of claim 9 wherein the information includes reference signal weighting data.

11. The method of claim 10 wherein the reference signal weighting data is associated with the first reference signal and the common reference signal.

12. The method of claim 2 further including transmitting a channel estimation signal, said channel estimation signal including information usable to estimate a channel associated with the first group of user devices and the user device.

13. The method of claim 12 wherein the information includes reference signal weighting data.

14. The method of claim 1 wherein the first reference signal is based at least in part on a system parameter.

15. The method of claim 14 wherein the system parameter is a channel condition.

16. The method of claim 15 wherein the channel condition is a time selectivity of the channel.

17. The method of claim 15 wherein the channel condition is a frequency selectivity of the channel.

18. The method of claim 14 wherein the system parameter is a rank.

19. The method of claim 1 wherein the first reference signal pattern has a first reference-signal density, the first reference-signal density being selected in accordance with at least one system parameter.

20. The method of claim 19 wherein the at least one system parameter relates to a number of user devices within the first group of user devices operating at ranks of transmission greater than a threshold rank of transmission.

21. The method of claim 19 wherein the at least one system parameter comprises a channel condition.

22. The method of claim 19 wherein the first reference signal pattern is defined over a single time-frequency resource block.

23. The method of claim 19 wherein the first reference signal pattern is defined over at least first and second contiguous time-frequency resource blocks.

24. The method of claim 23 wherein the first and second contiguous time-frequency resource blocks are contiguous in time.

25. The method of claim 23 wherein the first and second contiguous time-frequency resource blocks are contiguous in frequency.

26. An apparatus for use in a communications system, the apparatus comprising:
a reference signal selection module configured:
to select a first reference signal specific to a first group of user devices, the first reference signal having a first reference signal pattern based at least in part on a transmission mode of each user device of the first group, and the first reference signal having a first reference signal sequence based at least in part on a parameter associated with each user device of the first group, and
to select a common reference signal specific to a second group of user devices, the common reference signal having a second reference signal pattern that is different from the first reference signal pattern, the common reference signal having a second reference signal sequence that is different from the first reference signal sequence, and the second group of user devices including the first group of user devices; and
a transmit module configured to transmit the first reference signal and the common reference signal.

27. The apparatus of claim 26 wherein the reference signal selection module is further configured to select a second reference signal specific to a user device and wherein the transmit module is further configured to send the second reference signal.

28. The apparatus of claim 26 further including a precoding module configured to precode the first reference signal along a data direction associated with the first group of user devices.

29. The apparatus of claim 27 further including a precoding module configured to precode the second reference signal along a data direction associated with the user device.

30. The apparatus of claim 28 wherein the precoding module is further configured to precode a second reference signal along a data direction associated with the user device.

31. The apparatus of claim 26 further including a precoding module configured to precode the first reference signal along a data direction different from a data direction associated with the first group of user devices.

32. The apparatus of claim 27 further including a precoding module configured to precode the second reference signal along a data direction different from a data direction associated with the user device.

33. The apparatus of claim 31 wherein the precoding module is further configured to precode a second reference signal along a data direction different from a data direction associated with the user device.

34. The apparatus of claim 26 wherein the transmit module is further configured to transmit a channel estimation signal, the channel estimation signal including information usable to estimate a channel associated with the first group of user devices.

35. The apparatus of claim 34 wherein the information includes reference signal weighting data.

36. The apparatus of claim 35 wherein the reference signal weighting data is associated with the first reference signal and the common reference signal.

37. The apparatus of claim 27 wherein the transmit module is further configured to transmit a channel estimation signal, the channel estimation signal including information usable to estimate a channel associated with the first group of user devices and the user device.

38. The apparatus of claim 37 wherein the information includes reference signal weighting data.

39. The apparatus of claim 26 wherein the first reference signal is selected based at least in part on a system parameter.

40. The apparatus of claim 39 wherein the system parameter is a channel condition.

41. The apparatus of claim 40 wherein the channel condition is a time selectivity of the channel.

42. The apparatus of claim 40 wherein the channel condition is a frequency selectivity of the channel.

43. The apparatus of claim 39 wherein the system parameter is a rank.

44. The apparatus of claim 26 wherein the first reference signal pattern is further based on a first reference-signal density, the first reference-signal density being selected in accordance with at least one system parameter.

45. The apparatus of claim 44 wherein the at least one system parameter relates to a number of user devices within the first group of user devices operating at ranks of transmission greater than a threshold rank of transmission.

46. The apparatus of claim 44 wherein the at least one system parameter comprises a channel condition.

47. The apparatus of claim 44 wherein the first reference signal pattern is defined over a single time-frequency resource block.

48. The apparatus of claim 44 wherein the first reference signal pattern is defined over at least first and second contiguous time-frequency resource blocks.

49. The apparatus of claim 48 wherein the first and second contiguous time-frequency resource blocks are contiguous in time.

50. The apparatus of claim 48 wherein the first and second contiguous time-frequency resource blocks are contiguous in frequency.

51. A method for signal reception in a communications system, the method comprising:
receiving, at a user device, a first reference signal specific to a group of user devices, the first reference signal having a first reference signal pattern based at least in part on a transmission mode of each user device of the first group, and the first reference signal having a first reference signal sequence based at least in part on a parameter associated with each user device of the first group;
receiving, at the user device, a second reference signal specific to the user device, the second reference signal having a second reference signal pattern based at least in part on a transmission mode of the user device, the second reference signal having a second reference signal sequence that is different from the first reference signal sequence, and the second reference signal pattern being different from the first reference signal pattern; and
deriving a channel estimate based at least in part on the first reference signal and the second reference signal.

52. The method of claim 51 further comprising receiving, at the user device, a common reference signal, and wherein the deriving a channel estimate includes deriving the channel estimate based at least in part on the common reference signal.

53. The method of claim 51 wherein:
the first reference signal is carried by a first subset of time-frequency resource elements included within a time-frequency resource area, the first subset of time-frequency resource elements defining the first reference signal pattern over the time-frequency resource area; and
the second reference signal is carried by a second subset of time-frequency resource elements included within the time frequency resource area, the second subset of time-frequency resource elements defining the second reference signal pattern over the time-frequency resource area.

54. The method of claim 52 wherein:
the first reference signal is carried by a first subset of time-frequency resource elements included within a time-frequency resource area, the first subset of time-frequency resource elements defining the first reference signal pattern over the time-frequency resource area;
the second reference signal is carried by a second subset of time-frequency resource elements included within the time frequency resource area, the second subset of time-frequency resource elements defining the second reference signal pattern over the time-frequency resource area; and the common reference signal is carried by a third subset of time-frequency resource elements included within the time frequency resource area, the third subset of time-frequency resource elements defining a third reference signal pattern over the time-frequency resource area, the third reference signal pattern being different from the first reference signal pattern and the second reference signal pattern.

55. The method of claim 51 further comprising:
receiving a data signal at the user device; and
demodulating the data signal at least in part based on the channel estimate.

56. The method of claim 51 further including:
receiving a channel estimation signal, said channel estimation signal including information usable to estimate a channel associated with the first group of user devices; and
wherein the deriving a channel estimate is further based on the channel estimation signal.

57. The method of claim 56 wherein the information includes reference signal weighting data; and wherein the deriving a channel estimate is based at least in part on the weighting data.

58. The method of claim 51 wherein the first reference signal is based at least in part on a system parameter.

59. The method of claim 58 wherein the system parameter is a channel condition.

60. The method of claim 59 wherein the channel condition is a time selectivity of the channel.

61. The method of claim 59 wherein the channel condition is a frequency selectivity of the channel.

62. The method of claim 58 wherein the system parameter is a rank.

63. An apparatus for use in a communications system, the apparatus comprising:
a receiver module configured to receive a first reference signal specific to a group of user devices and a second reference signal specific to a user device, the first reference signal having a first reference signal pattern based at least in part on a transmission mode of each user device of the first group, and the first reference signal having a first reference signal sequence based at least in part on a parameter associated with each user device of the first group, the second reference signal having a second reference signal pattern based at least in part on a transmission mode the user device, the second reference signal having a second reference signal sequence that is different from the first reference signal sequence, and the second reference signal pattern being different from the first reference signal pattern; and
a channel estimation module configured to derive a channel estimate based at least in part on the first reference signal and the second reference signal.

64. The apparatus of claim 63 wherein the receiver module is further configured to receive a common reference signal and wherein the deriving a channel estimate further includes deriving the channel estimate based at least in part on the common reference signal.

65. The apparatus of claim 64 wherein:
the first reference signal is carried by a first subset of time-frequency resource elements included within a time-frequency resource area, the first subset of time-frequency resource elements defining the first reference signal pattern over the time-frequency resource area; and
the second reference signal is carried by a second subset of time-frequency resource elements included within the time frequency resource area, the second subset of time-frequency resource elements defining the second reference signal pattern over the time-frequency resource area.

66. The apparatus of claim 64 wherein:

the first reference signal is carried by a first subset of time-frequency resource elements included within a time-frequency resource area, the first subset of time-frequency resource elements defining the first reference signal pattern over the time-frequency resource area;

the second reference signal is carried by a second subset of time-frequency resource elements included within the time frequency resource area, the second subset of time-frequency resource elements defining the second reference signal pattern over the time-frequency resource area; and the common reference signal is carried by a third subset of time-frequency resource elements included within the time frequency resource area, the third subset of time-frequency resource elements defining a third reference signal pattern over the time-frequency resource area, the third reference signal pattern being different from the first reference signal pattern and the second reference signal pattern.

67. The apparatus of claim 63 wherein the receiver module is further configured to receive a data signal; and further comprising a demodulation module configured to demodulate the data signal at least in part based on the channel estimate.

68. The apparatus of claim 63 wherein the receiver module is further configured to receive a channel estimation signal, said channel estimation signal including information usable to estimate a channel associated with the first group of user devices; and wherein the channel estimation module is further configured to derive the channel estimate based at least in part on the channel estimation signal.

69. The apparatus of claim 68 wherein the information includes reference signal weighting data; and wherein the deriving a channel estimate is based at least in part on the weighting data.

70. The apparatus of claim 63 wherein the first reference signal is based at least in part on a system parameter.

71. The apparatus of claim 70 wherein the system parameter is a channel condition.

72. The apparatus of claim 71 wherein the channel condition is a time selectivity of the channel.

73. The apparatus of claim 71 wherein the channel condition is a frequency selectivity of the channel.

74. The apparatus of claim 70 wherein the system parameter is a rank.

75. A computer program product for wireless communication in a wireless network, the computer program product comprising:

a non-transitory computer-readable medium having non-transitory program code recorded thereon, the program code comprising:

program code to transmit a first reference signal specific to a first group of user devices, the first reference signal having a first reference signal pattern based at least in part on a transmission mode of each user device of the first group, and the first reference signal having a first reference signal sequence based at least in part on a parameter associated with each user device of the first group; and program code to transmit a common reference signal to a second group of user devices, the second group of user devices including the first group of user devices, the common reference signal having a second reference signal pattern, the common reference signal having a second reference signal sequence that is different from the first reference signal sequence, and the second reference signal pattern being different from the first reference signal pattern.

76. The computer program product of claim 75 further comprising program code to transmit a second reference signal specific to a user device.

77. The computer program product of claim 75 comprising program code to precode the first reference signal along a data direction associated with the first group of user devices.

78. The computer program product of claim 75 further comprising program code to precode the second reference signal along a data direction associated with the user device.

79. The computer program product of claim 75 further comprising:

program code to select a time frequency resource area and a first subset of time-frequency resource elements included within the time-frequency resource area to carry a first reference signal, the first subset of time-frequency resource elements defining the first reference signal pattern over the time-frequency resource area disposed for channel estimation; and program code to transmit the first reference signal to a first group of user devices.

80. The computer program product of claim 79 wherein the first reference signal pattern is further based on a first reference-signal density, and further comprising program code to select the first reference-signal density in accordance with at least one system parameter.

81. The computer program product of claim 80 wherein the at least one system parameter comprises a channel condition.

82. The computer program product of claim 81 wherein the channel condition is a time selectivity of the channel.

83. The computer program product of claim 81 wherein the channel condition is a frequency selectivity of the channel.

84. An apparatus for use in a communications system, the apparatus comprising:

means for selecting a first reference signal specific to a first group of user devices and a common reference signal specific to a second group of user devices, the second group of user devices including the first group of user devices, the first reference signal having a first reference signal pattern based at least in part on a transmission mode of each user device of the first group, and the first reference signal having a first reference signal sequence based at least in part on a parameter associated with each user device of the first group, the common reference signal having a second reference signal pattern, the common reference signal having a second reference signal sequence that is different from the first reference signal sequence, and the second reference signal pattern being different from the first reference signal pattern; and means for transmitting the first reference signal and the common reference signal.

85. The apparatus of claim 84 further including means for selecting a second reference signal specific to a user device and means for sending the second reference signal.

86. The apparatus of claim 84 further including means for precoding the first reference signal along a data direction associated with the first group of user devices.

87. The apparatus of claim 85 further including means for precoding a second reference signal along a data direction associated with the user device.

88. A computer program product for wireless communication in a wireless network, the computer program product comprising:

a non-transitory computer-readable medium having non-transitory program code recorded thereon, the program code comprising:

program code to receive, at a user device, a first reference signal specific to a group of user devices;

program code to receive, at the user device, a second reference signal specific to the user device, the first reference signal having a first reference signal pattern based at least in part on a transmission mode of each user device of the first group, and the first reference signal having a first reference signal sequence based at least in part on a parameter associated with each user device of the first group, the second reference signal having a second reference signal pattern based at least in part on a transmission mode of the user device, the second reference signal having a second reference signal sequence that is different from the first reference signal sequence, and the second reference signal pattern being different from the first reference signal pattern; and program code to derive a channel estimate based on at least the first reference signal and the second reference signal.

89. An apparatus for use in a communications system, the apparatus comprising:

means for receiving a first reference signal specific to a group of user devices and a second reference signal specific to a user device, the first reference signal having a first reference signal pattern based at least in part on a transmission mode of each user device of the first group, and the first reference signal having a first reference signal sequence based at least in part on a parameter associated with each user device of the first group, the second reference signal having a second reference signal pattern, the second reference signal having a second reference signal sequence that is different from the first reference signal sequence, and the second reference signal pattern being different from the first reference signal pattern; and means for deriving a channel estimate based on at least the first reference signal and the second reference signal.

90. The apparatus of claim 89 further including means for receiving a common reference signal and means for deriving the channel estimate based at least in part on the common reference signal.

91. The apparatus of claim 89 further including means for receiving a data signal and means for demodulating the data signal at least in part based on the channel estimate.

* * * * *